US012723383B2

(12) United States Patent
So et al.

(10) Patent No.: US 12,723,383 B2
(45) Date of Patent: Sep. 1, 2026

(54) FAUCET WITH COUPLING SYSTEM

(71) Applicant: Fortune Brands Water Innovations LLC, North Olmsted, OH (US)

(72) Inventors: Ki Y. So, Seven Hills, OH (US); Harshil Parikh, Fremont, CA (US)

(73) Assignee: Fortune Brands Water Innovations LLC, Deerfield, IL (US)

( * ) Notice: Subject to any disclaimer, the term of this patent is extended or adjusted under 35 U.S.C. 154(b) by 0 days.

(21) Appl. No.: 18/427,007

(22) Filed: Jan. 30, 2024

(65) Prior Publication Data

US 2024/0254739 A1 Aug. 1, 2024

Related U.S. Application Data

(60) Provisional application No. 63/482,247, filed on Jan. 30, 2023, provisional application No. 63/482,249, filed on Jan. 30, 2023, provisional application No. 63/482,241, filed on Jan. 30, 2023, provisional application No. 63/482,242, filed on Jan. 30, 2023.

(51) Int. Cl.

| | |
|---|---|
| ***E03C 1/04*** | (2006.01) |
| ***E03C 1/02*** | (2006.01) |
| ***F16L 11/20*** | (2006.01) |

(52) U.S. Cl.
CPC .............. *E03C 1/0404* (2013.01); *E03C 1/04* (2013.01); *E03C 1/0403* (2013.01); *F16L 11/20* (2013.01); *E03C 2001/026* (2013.01); *E03C 2001/0415* (2013.01); *Y10T 137/9464* (2015.04)

(58) Field of Classification Search
CPC ................. E03C 1/0404; E03C 1/0415; Y10T 137/9464; F16L 11/20; F16L 11/22
USPC .......................................................... 137/801
See application file for complete search history.

(56) References Cited

U.S. PATENT DOCUMENTS

| | | | |
|---|---|---|---|
| 4,431,031 A | 2/1984 | Ettlinger | |
| 6,016,975 A | 1/2000 | Amaduzzi | |
| 8,752,867 B2 | 6/2014 | Mager et al. | |
| 9,181,685 B2 * | 11/2015 | Esche | E03C 1/055 |
| 9,261,213 B2 | 2/2016 | Mager et al. | |
| 9,447,904 B2 | 9/2016 | Kury et al. | |
| 9,458,958 B2 | 10/2016 | Kury et al. | |

(Continued)

FOREIGN PATENT DOCUMENTS

CN 216382681 U 4/2022

OTHER PUBLICATIONS

International Search Report for International App. No. PCT/US2024/013508 dated May 28, 2024 (5 pages).

(Continued)

*Primary Examiner* — Daphne M Barry

(74) *Attorney, Agent, or Firm* — Calfee, Halter & Griswold LLP

(57) ABSTRACT

The present invention provides a wand hose for providing two flow paths to a faucet with a wand that can be pulled away from a body of the faucet. The hose includes an inner hose defining a first flow path which extends through an outer hose. A second flow path extends between the inner hose and the outer sleeve. The first flow path couples to a first wand waterway and the second flow path couples to a second wand waterway. The inner hose may be continuously pressurized with fluid. The downstream end of the inner hose may be relatively unsecured in the wand.

20 Claims, 23 Drawing Sheets

(56) References Cited

U.S. PATENT DOCUMENTS 9,644,351 B2 5/2017 Zhang et al.
10,066,375 B2 * 9/2018 Kostorz ................ E03C 1/0403
10,400,428 B2 * 9/2019 Wang .................... E03C 1/0404
10,612,220 B2 * 4/2020 Myers ................... E03C 1/0404
11,598,460 B2 3/2023 Echtle et al.
12,281,714 B2 * 4/2025 Erickson ............... E03C 1/0404
12,312,782 B2 * 5/2025 Erickson ............... E03C 1/0404
12,343,690 B2 * 7/2025 Dahan .................. B67D 1/0052
2004/0010848 A1 * 1/2004 Esche ....................... E03C 1/04 4/675
2007/0199879 A1 8/2007 Bors et al.
2007/0235091 A1 * 10/2007 Granot .................. E03C 1/0404 137/597
2008/0291660 A1 11/2008 Gautschi et al.
2011/0309616 A1 12/2011 Mager et al.
2014/0246851 A1 9/2014 Mager et al.
2015/0076252 A1 * 3/2015 Peteri ...................... E03C 1/084 239/428.5
2015/0219260 A1 8/2015 Kury et al.
2015/0226356 A1 8/2015 Kury et al.
2016/0090718 A1 3/2016 Zhang et al.
2016/0236223 A1 8/2016 Scheffer et al.
2016/0312449 A1 10/2016 Kostorz
2017/0101325 A1 * 4/2017 Ye ......................... E03C 1/0412
2019/0301146 A1 10/2019 Macsay
2020/0181892 A1 6/2020 Macsay
2021/0003236 A1 1/2021 Echtle et al.
2021/0025149 A1 1/2021 Huang et al.
2021/0148101 A1 5/2021 Lev
2021/0179461 A1 6/2021 Rosko et al.
2023/0192468 A1 6/2023 Torak et al.

OTHER PUBLICATIONS

Written Opinion of the International Search Authority for International App. No. PCT/US2024/013508 dated May 28, 2024 (8 pages).
First Office Action issued by the U.S. Patent and Trademark Office for U.S. Appl. No. 18/427,015 dated Sep. 30, 2025 (25 pages).

* cited by examiner

FAUCET WITH COUPLING SYSTEM

CROSS-REFERENCE TO RELATED APPLICATIONS

This application claims the benefit of U.S. Provisional Patent Application Nos. 63/482,241, titled "FAUCET WITH COUPLING SYSTEM," 63/482,242, titled "WAND FOR PULLOUT FAUCET," 63/482,247, titled "CONNECTOR FOR SUPPLY SYSTEM OF A FAUCET," and 63/482,249, titled "WAND FOR PULLOUT FAUCET," each filed on Jan. 30, 2023, the entire disclosures of which are incorporated herein by reference.

FIELD

The present invention relates generally to a faucet system, and, more particularly, to a faucet system with a wand that can be pulled away from a body of a faucet and is manipulated, a flow system and a connector configured to supply two flow paths via a single wand hose to the wand, one the flow paths may be continuously pressurized, and a shutoff mechanism in the wand for controlling a supply of continuously pressurized fluid.

BACKGROUND

Faucets with wands that can be pulled away from a body of the faucet can be difficult to manufacture and assemble. Prior flow systems for such faucets may be difficult to construct and difficult to operate in a desired manner. For example, users may need to use another hand or redock the wand portion to change water temperature, flow rate, or switch to/from treated water. Additionally, there may be a time delay between a user attempting to adjust an attribute in the water and the resulting change in water attribute and there may be electrical systems and power required to implement the change. Further, after a user has signaled to adjust a water attribute, one or more supply hoses may decrease in pressure resulting in an additional amount of water being discharged from the faucet, such as after the faucet has been turned off. Moreover, the increased number of flow paths to the wand (e.g., different hoses) for different fluids, such as a flow path (e.g., hose) for unfiltered (e.g., mixed) water and a flow path (e.g., hose) for treated water, may reduce the functionality of the wand portion and/or result in increased stress and strain when manipulated by a user.

SUMMARY

The present invention provides a faucet system having a wand that may be pulled away from a body of a faucet and manipulated. The wand may be coupled with two flow paths to supply fluid to the wand and one of the flow paths may be continuously pressurized. The faucet system may include a hose for providing two flow paths via a single wand hose to the faucet. The wand may be pulled away from the body of the faucet and may include a shutoff mechanism for controlling the flow of fluid through the wand, such as for controlling a supply of continuously pressurized water.

In an exemplary embodiment, a wand hose is provided that can be pulled away from a body of a faucet. The wand hose includes an outer hose having an inlet, an outlet, and an inner surface, and an inner hose extending through the outer hose and having an inlet, an outlet, an inner surface, and an outer surface. Downstream ends of the outer hose and inner hose are configured to operatively couple with an upstream portion of the wand. The inner hose is operable to receive a first fluid supply. The wand hose is operable to receive a second fluid supply. The inner hose is continuously pressurized up to the wand.

In an exemplary embodiment, a faucet is provided. The faucet includes a body, a wand having a first waterway and a second waterway, and a wand hose having an outer hose and an inner hose extending through the outer hose. A downstream end of the wand hose is coupled with an upstream portion of the wand with a downstream end of the inner hose rotatably disposed in the first waterway. The wand hose is configured to direct a continuously pressurized supply of a first fluid through the inner hose to the first waterway of the wand. The wand hose is also configured to direct a supply of a second fluid to the second waterway of the wand.

In an exemplary embodiment, a wand hose for a wand of a faucet is provided. The wand hose includes an outer hose having an inlet, an outlet, and an inner surface, and an inner hose extending through the outer hose and having an inlet, an outlet, an inner surface, and an outer surface. Downstream ends of the outer hose and inner hose are coupled with the wand. The inner hose is operable to receive a treated water supply through the inner hose. The wand hose is operable to receive a mixed water supply. The inner hose is continuously pressurized up to the wand.

In an exemplary embodiment, a wand hose for a wand of a faucet is provided. The wand hose includes an outer hose having an inlet, an outlet, and an inner surface, an inner hose extending through the outer hose and having an inlet, an outlet, an inner surface, and an outer surface, and a hose coupler disposed on a downstream end of the outer hose and operable to couple with an upstream end of the wand. The inner hose is operable to receive a first fluid supply. The wand hose is operable to receive a second fluid supply. The hose coupler is configured to enable the wand to swivel about the hose coupler.

In an exemplary embodiment, a faucet is provided. The faucet includes a body, a wand having a first waterway and a second waterway, and a wand hose having an outer hose and an inner hose extending through the outer hose. A downstream end of the wand hose is coupled with an upstream portion of the wand. The wand hose is configured to direct a supply of a first fluid through the inner hose to the first waterway of the wand and to direct a supply of a second fluid to the second waterway of the wand. A downstream end of the inner hose extends through a downstream end of the outer hose into the first waterway and is rotatable and translatable within the first waterway.

In an exemplary embodiment, a wand hose for a wand of a faucet is provided. The wand hose includes an outer hose having an inlet, an outlet, and an inner surface, an inner hose extending through the outer hose and having an inlet, an outlet, an inner surface, and an outer surface, a hose coupler disposed at a downstream end of the outer hose and operable to couple with an upstream end of the wand, and a fitting disposed at a downstream end of the inner hose and having an outer circumference with a diameter larger than a diameter of the outer surface of the inner hose. The inner hose is operable to receive a first fluid supply. The wand hose is operable to receive a second fluid supply. A downstream portion of the inner hose extends through the hose coupler. The hose coupler is configured to enable the wand to swivel about the hose coupler.

In an exemplary embodiment, a connector for directing fluid through a wand hose of a faucet system is provided.

The connector includes a first inlet extending into a first bore, a second inlet extending into a second bore, and an outlet extending into a third bore. A first passage connects the first bore with the third bore. A second passage connects the second bore with the third bore. The first passage is operable to receive an inner hose of the wand hose from the third bore to the first bore. The second passage is operable to direct fluid from the second bore to a flow path of the wand hose.

In an exemplary embodiment, a supply system for a faucet having a wand is provided. The supply system includes a wand hose having an outer hose and an inner hose extending through an interior of the outer hose, and a connector having a first inlet portion with a first bore, a second inlet portion with a second bore, an outlet portion with a third bore, a first passage connecting the first bore and the third bore, and a second passage connecting the second bore and the third bore. The inner hose extends from the third bore through the first passage to the first bore and is operable to receive a first fluid supply. The connector is operable to direct a second fluid received in the second bore through the second passage and between the inner hose and outer hose. The connector is movable within the system.

In an exemplary embodiment, a faucet system is provided. The faucet system includes a faucet with a body and a wand with a first waterway and a second waterway, a mixed water hose, a wand hose with an inner hose defining a first flow path and an outer hose disposed around the inner hose and defining a second flow path, and a connector with a first inlet, a second inlet, and an outlet. An upstream end of the inner hose is coupled with a treated water supply to provide treated water through the first flow path extending from the first inlet to the outlet and to the wand. A downstream end of the mixed water hose is coupled with the second inlet of the connector to provide mixed water to the connector. An upstream end of the outer hose is coupled with the outer hose to operably receive mixed water through the second flow path.

In an exemplary embodiment, a wand for a faucet is provided. The wand includes a frame with a waterway operable to receive fluid from a wand hose, an outlet disposed at a downstream end of the waterway, and a shutoff mechanism disposed in the waterway and operable to control the flow of fluid through the waterway to the outlet. The wand hose is continuously pressurized with fluid. The shutoff mechanism is movable between a first position configured to prevent the flow of fluid in the waterway downstream of the shutoff mechanism and a second position configured to allow the flow of fluid in the waterway downstream of the shutoff mechanism to the outlet.

In an exemplary embodiment, a wand for a faucet is provided. The wand includes a frame having a waterway operable to receive fluid from a wand hose, an outlet disposed at a downstream end of the waterway, and a shutoff mechanism disposed in the waterway and defining a flow path, the shutoff mechanism including first and second gates each having a plurality of windows and a plurality of shutter portions. The fluid from the wand hose is continuously pressurized with fluid. The first gate is rotatable relative to the second gate to control the flow of fluid through the flow path of the shutoff mechanism.

In an exemplary embodiment, a wand for a faucet is provided. The wand includes a frame having a waterway operable to receive continuously pressurized treated water from a wand hose, an outlet disposed at a downstream end of the waterway, and a shutoff mechanism disposed in the waterway and operable to control the flow of the continuously pressurized treated water from the wand hose through the waterway to the outlet. The shutoff mechanism is movable between a first position configured to prevent the flow of treated water in the waterway downstream of the shutoff mechanism and a second position configured to allow the flow of treated water in the waterway downstream of the shutoff mechanism to the outlet.

BRIEF DESCRIPTION OF THE DRAWINGS

To further clarify various aspects of implementations of the present disclosure, a more particular description of the certain examples and implementations will be made by reference to various aspects of the appended drawings. These drawings depict only example implementations of the present disclosure and are therefore not to be considered limiting of the scope of the disclosure. Moreover, while the Figures can be drawn to scale for some examples, the Figures are not necessarily drawn to scale for all examples. Examples and other features and advantages of the present disclosure will be described and explained with additional specificity and detail through the use of the accompanying drawings in which.

DETAILED DESCRIPTION

The present invention provides a faucet system with a wand hose for a wand of a faucet that may be pulled away from a body of the faucet and manipulated by a user during use. The wand hose may provide two flow paths to the wand via a single wand hose, in which one of the flow paths may be continuously pressurized. The faucet system may also include a connector for providing two flow paths to the faucet, such as to the wand of the faucet. The faucet system may also include a shutoff mechanism in the wand operable to control the flow of a supply of continuously pressurized fluid provided to the wand.

Figure 1:
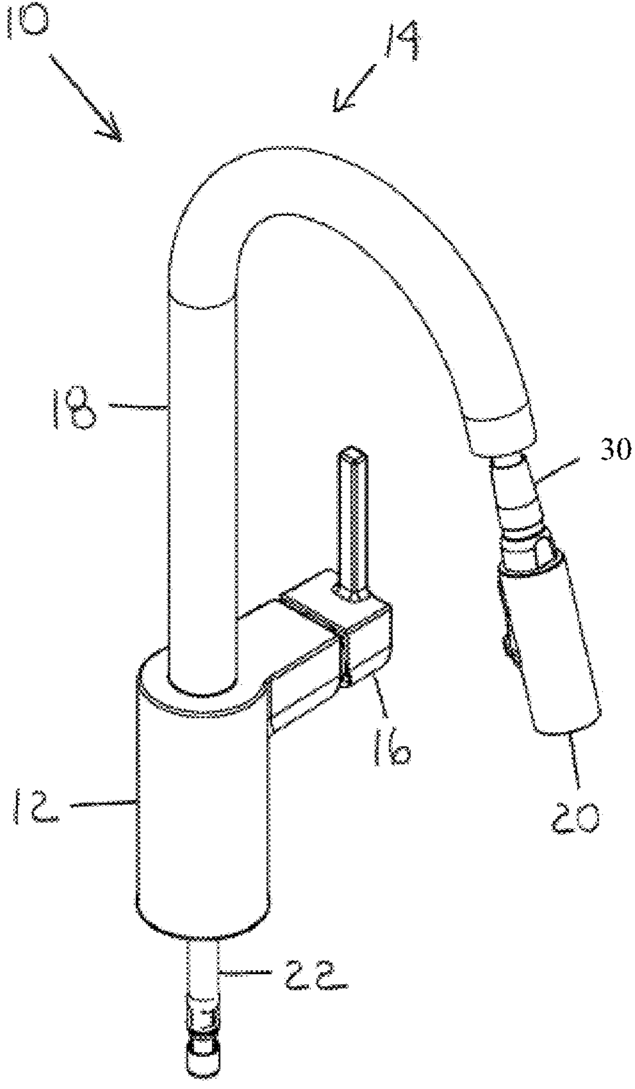
FIGS. 1-2 are perspective views of a faucet.
Figure 2:
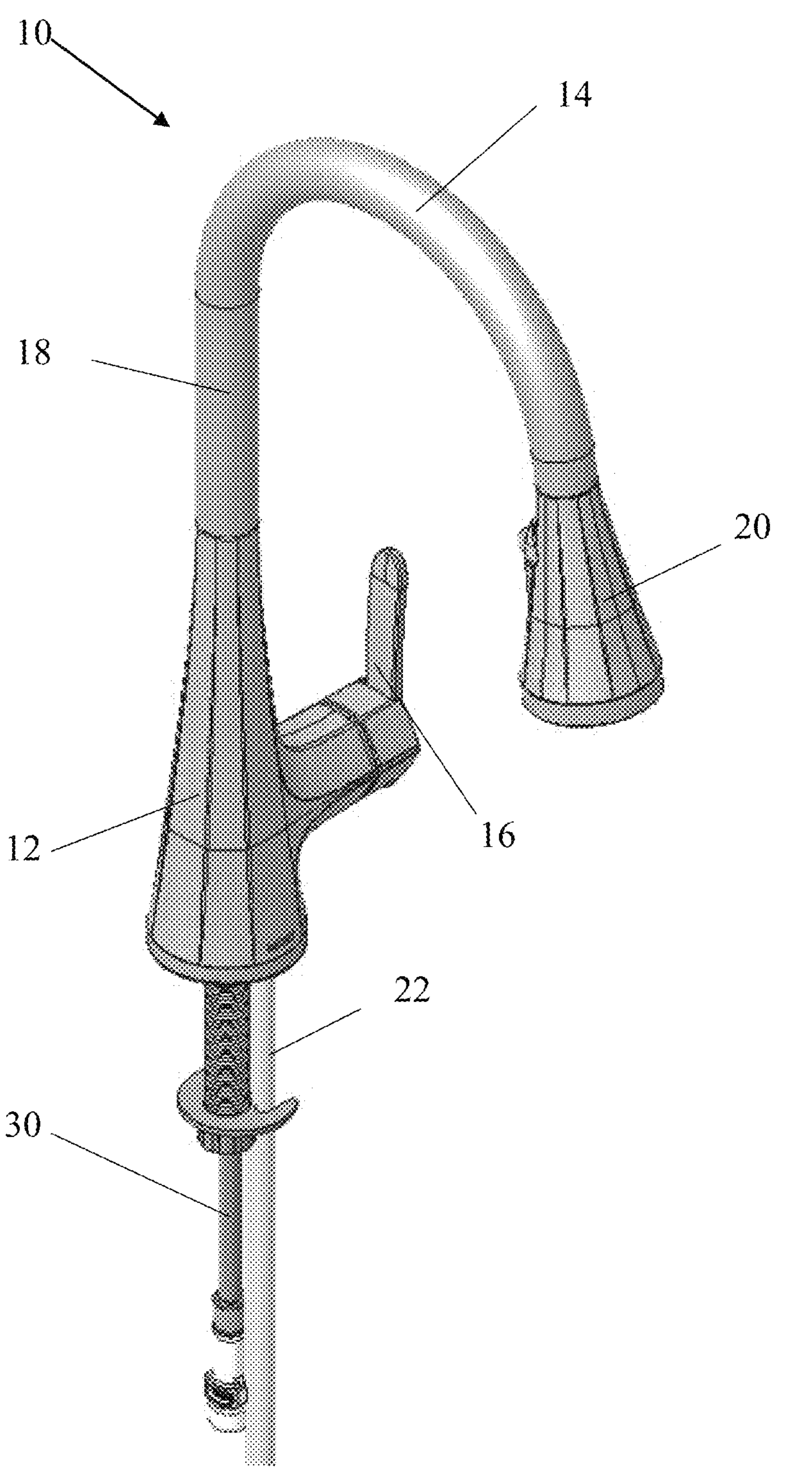

An exemplary embodiment of a faucet 10 is shown in FIGS. 1-2. The faucet 10, includes a hub 12, a spout 14, and a handle 16. The spout 14 includes a receptor 18 and a wand 20. A base of the hub 12 is connected (either directly or indirectly) to a mounting surface (such as a counter or sink). An upstream end of the receptor 18 is connected to the hub 12. In the illustrated embodiment, the upstream end of the receptor 18 is connected to a top of the hub 12. In another embodiment, the upstream end of the receptor 18 is connected to a side of the hub 12. An upstream end of the wand 20 is mounted in a downstream end of the receptor 18. The upstream end of the wand 20 is connected to a wand hose 30. The wand hose 30 extends through the receptor 18 and the hub 12. The wand 20 is operable to deliver water from the faucet 10. The handle 16 is connected to the hub 12. In the illustrated embodiment, the handle 16 is connected to a side of the hub 12. In another embodiment, the handle 16 is connected to the top of the hub 12. The handle 16 is operable to move relative to the hub 12.

In the illustrated embodiment, the hub 12 and the spout 14 together form a body of the faucet 10. However, one of ordinary skill in the art will appreciate that the body does not need to include each of the components.

The wand 20 may include a shell and one or more flow paths or waterways. The shell is operable to pull away from the body of the faucet 10, such as from the receptor 18. The waterways may be separately formed from the shell and may be substantially disposed within the shell. Each waterway may extend through the shell of the wand 20. In some embodiments, the wand 20 includes a first waterway for a first fluid and a second waterway for a second fluid. The first waterway may direct (e.g., provide) the first fluid to a first outlet at a downstream end of the wand 20. In some embodiments, the second waterway may direct (e.g., provide) the second fluid to a second outlet at a downstream end of the wand. In other embodiments, the second waterway directs (e.g., provides) the second fluid to a diverter mechanism configured to divert the second fluid between two or more outlets at a downstream end of the wand. For example, the diverter mechanism may be operable by a user, such as via a button or switch, to divert the second fluid between an aerator outlet and/or at least one spray outlet.

The faucet 10 may include a cartridge assembly and a valve body, the cartridge assembly being connected to the handle 16. Cartridge assemblies for faucets are well-known in the art and, therefore, only the relevant components of the cartridge assembly will be described in greater detail. The valve body of the cartridge assembly includes a cold water inlet operable to receive a supply of cold water from a cold water supply hose and a hot water inlet operable to receive a supply of hot water from a hot water supply hose. The cartridge assembly also includes a mixed water outlet operable to deliver mixed water to a mixed water hose 22 downstream of the cartridge assembly. The valve body includes various openings and flow paths for receiving cold and hot water from the cold and hot water supply hoses. The valve body of the cartridge assembly is configured to direct an amount of cold water from the cold water supply hose and/or an amount of hot water from the hot water supply hose to the mixed water hose 22, such as based upon movement of the handle 16 by a user.

The handle 16 may be used to control the temperature and flow of some water being delivered from the faucet 10. The cartridge assembly may control the temperature and flow of some water being delivered from the faucet 10 based on movement of the handle 16 by a user.

The mixed water hose 22 may extend below the faucet 10, such as below the mounting surface (e.g., counter or sink), from the cartridge assembly. The mixed water hose 22 may be fluidly coupled with an upstream end of the wand 20, such as via the wand hose 30, to provide a supply of mixed water to one of the waterways of the wand 20, such as to a second waterway of the wand 20. The mixed water hose 22 extends a distance beneath the faucet 10 to allow the wand 20 to be pulled away from the body of the faucet 10, such as from the receptor 18. A downstream end of the mixed water hose 22 may be coupled with the wand hose 30 via a connector such that the mixed water hose 22 is fluidly connected to the wand 20. In some embodiments, the mixed water hose 22 extends a distance beneath the faucet 10, loops back into and through the body of the faucet 10, and couples with the upstream end of the wand 20. In other embodiments, the mixed water hose 22 extends from the cartridge assembly and couples with an upstream end of the wand hose 30, such as via a connector, to provide a supply of mixed water to a flow path of the wand hose 30 to be directed to the wand 20.

The wand hose 30 is coupled with the upstream end of the wand 20 and may provide one or more fluids to the one or more waterways of the wand 20, as detailed below. An upstream end of the wand hose 30 extends below the faucet 10 and a downstream end of the wand hose 30 is coupled with the wand 20 such that the wand 20 may be pulled away from the receptor 18 during use, as detailed below.

In some embodiments, the wand 20 of the faucet 10 may also be fluidly coupled with a fluid supply, such as a treated fluid supply, to receive a supply of fluid, such as a supply of treated water. The treated fluid supply may supply filtered water, heated water, sterilized water (e.g., via ultraviolet sterilization), fluoridated water, pH corrected water, softened/hardened water, and the like, and the supply of treated fluid may be continuously pressurized. The treated fluid supply may output a continuously pressurized supply of treated water. In an exemplary embodiment, the treated fluid supply is a filter system which supplies filtered water, such as a continuously pressurized supply of filtered water. The wand 20 may be coupled with the treated fluid supply, directly or indirectly, via the wand hose 30 to supply treated water to the wand 20, such as to one of the waterways of the wand 20. In other embodiments, the wand 20 is fluidly coupled with the treated fluid supply directly via a treated water supply hose extending from the treated fluid supply of the wand 20. While the wand hose 30 has been described as being coupled with a treated fluid supply, it will be understood that the wand hose 30 may be coupled with other fluid supplies. For example, the wand hose 30 may be coupled with hot and cold water supplies.

The wand hose 30 may be configured to provide multiple flow paths for separately providing two or more different fluids to one or more waterways in the wand 20. For example, the wand hose 30 may provide a first flow path for the fluid received from the treated water supply and a second flow path for the fluid received from the mixed water hose 22. The wand hose 30 may be coupled with the wand 20 to provide the contents of the treated water supply to a first waterway in the wand 20 and the contents of the mixed water hose 22 to a second waterway in the wand 20.

Figure 3:
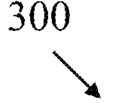
FIG. 3 is a side view of a filter system.
Figure 3:
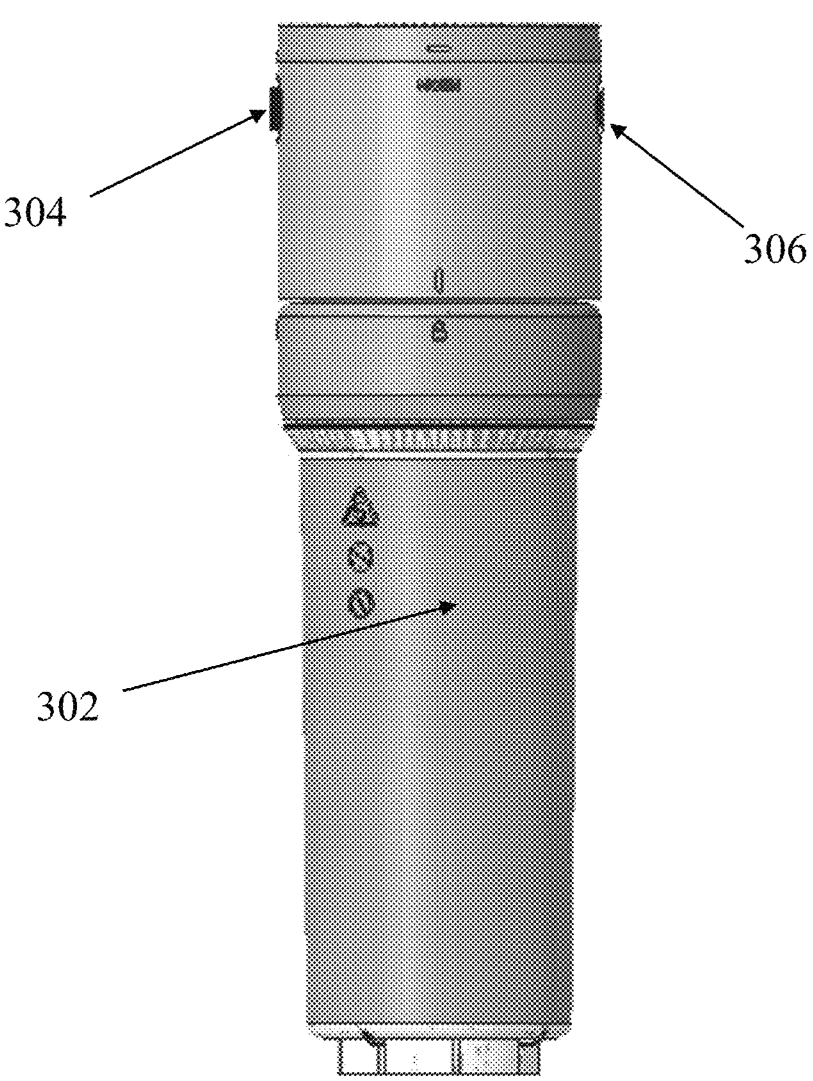

An exemplary embodiment of a filter system 300 for providing filtered watered to the faucet 10 is shown in FIG. 3. The filter system 300 includes a filter 302 configured to filter a received fluid, a filter inlet 304 configured to receive a fluid, such as unfiltered water, from a fluid supply, and a filter outlet 306 configured to output a filtered fluid, such as filtered water. The filter inlet 304 may be fluidly connected to the fluid supply via one or more input hoses configured to direct the fluid from the fluid supply to the filter inlet 304. The filter outlet 306 may be fluidly connected to one or more output hoses configured to direct the filtered fluid to one or more destinations. For example, the filter inlet 304 may receive a supply of unfiltered water, the filter 302 may filtrate the unfiltered water, and the filter outlet 306 may output filtered water directly or indirectly to the faucet 10, such as via the connector 200. In some embodiments, the filter 302 is configured to provide a continuously pressurized supply of filtered water out of the filter outlet 306. In some embodiments, the filter outlet 306 is fluidly connected to the wand 20 such that filtered water may be provided to an upstream end of the wand 20 and out of one of the outlets (e.g., to one or more waterways) in the wand 20. The filter system 300 may be disposed below the mounting surface (e.g., counter or sink). The filter system 300 may be coupled with the wand 20 directly or indirectly, such as with the inner hose inlet 44 of the inner hose 42 and/or the connector 200.

Figure 4:
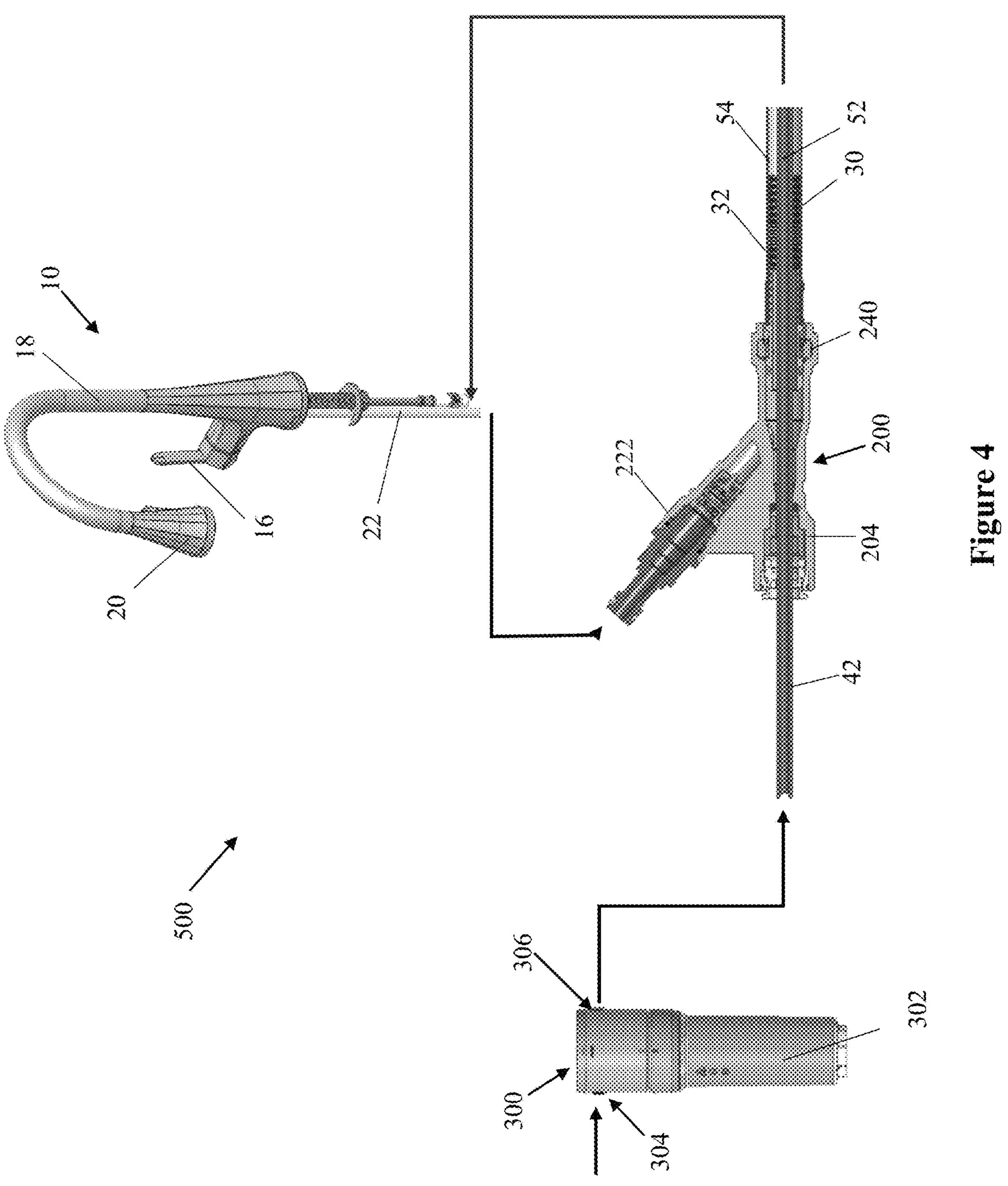
FIG. 4 is a plan layout of a faucet system including the faucet of FIGS. 1-2, the filter system of FIG. 3, and a connector.
Figure 5:
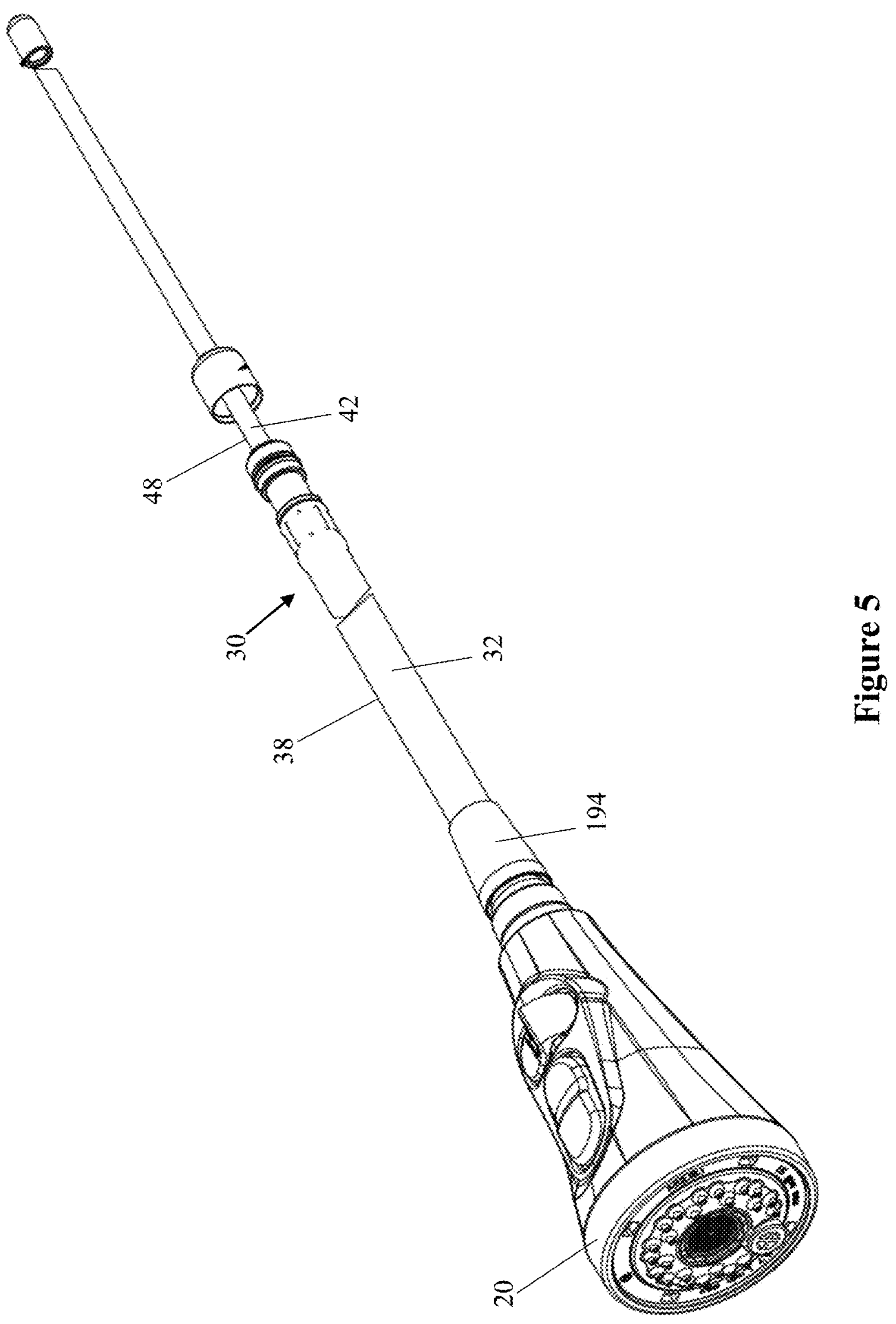
FIG. 5 is a perspective view of a wand hose coupled with a wand.
Figure 6:
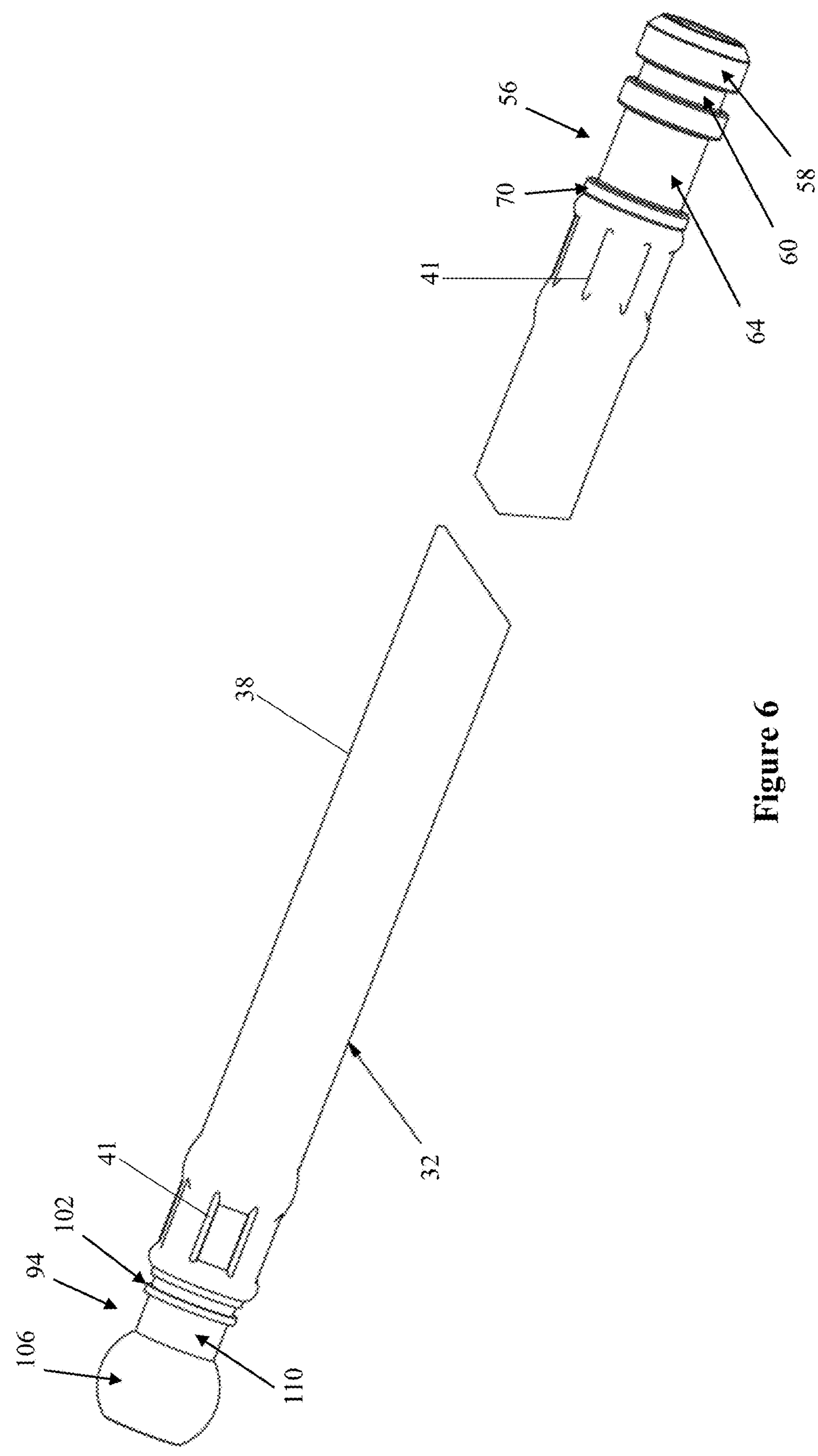
FIG. 6 is a perspective view of an outer hose of the hose wand of FIG. 5.
Figures 7, 8:
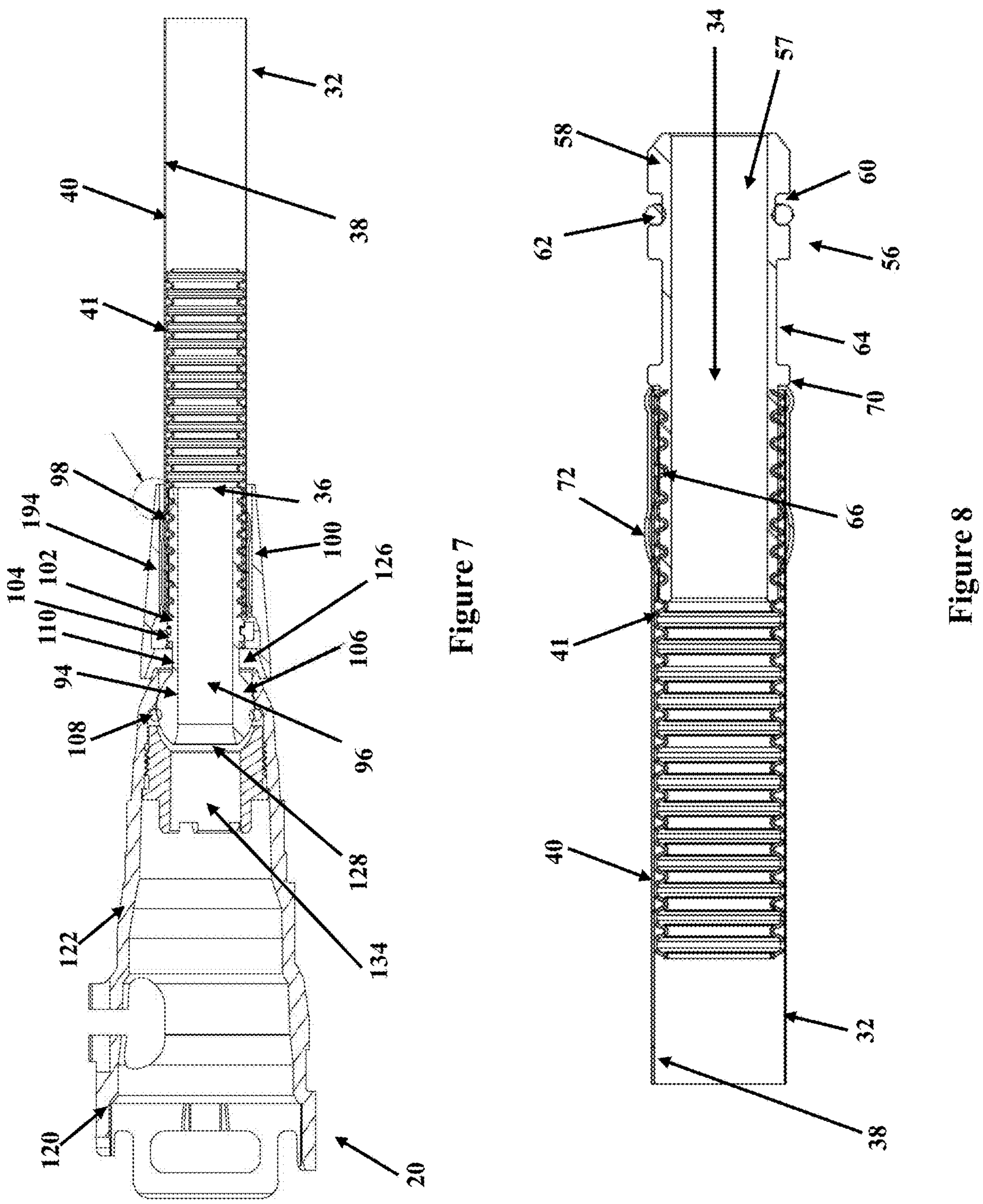
FIG. 7 is a side cross-sectional view of a downstream end of the outer hose of FIG. 6 coupled with a frame of the wand.
FIG. 8 is a side cross-sectional view of an upstream end of the outer hose of FIG. 6.
Figure 9:
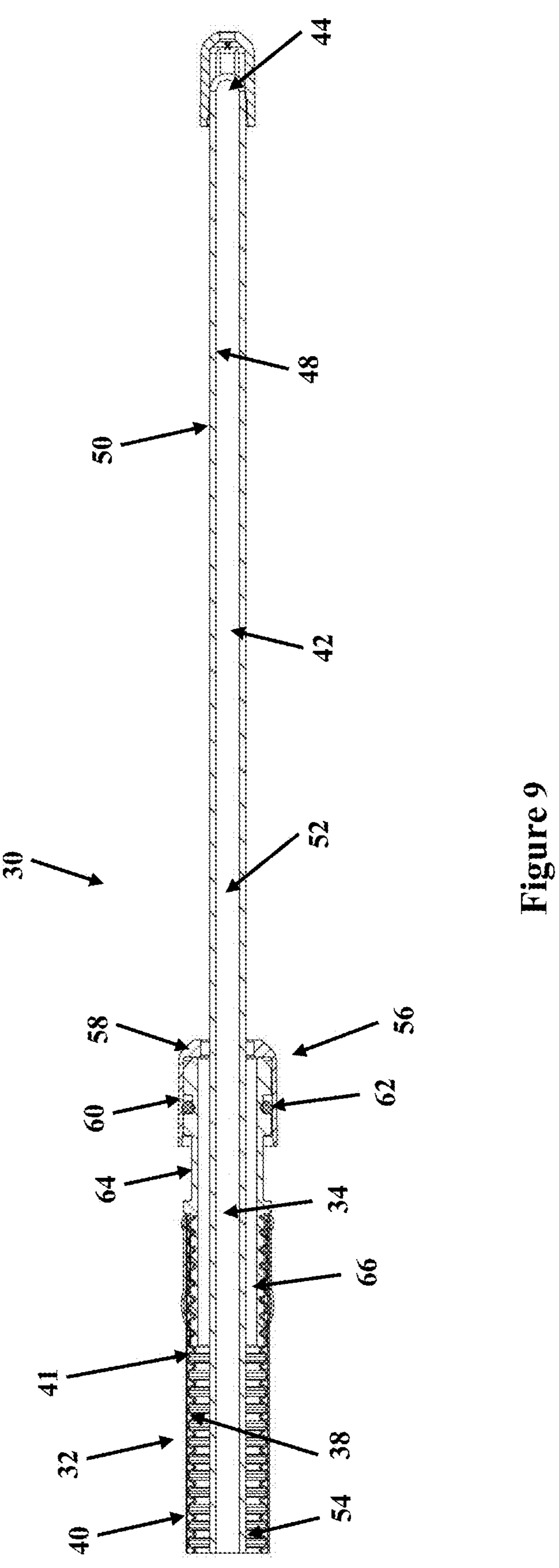
FIG. 9 is a side cross-sectional view of an upstream end of the wand hose of FIG. 5 with an inner hose extending through the outer hose.
Figure 10:
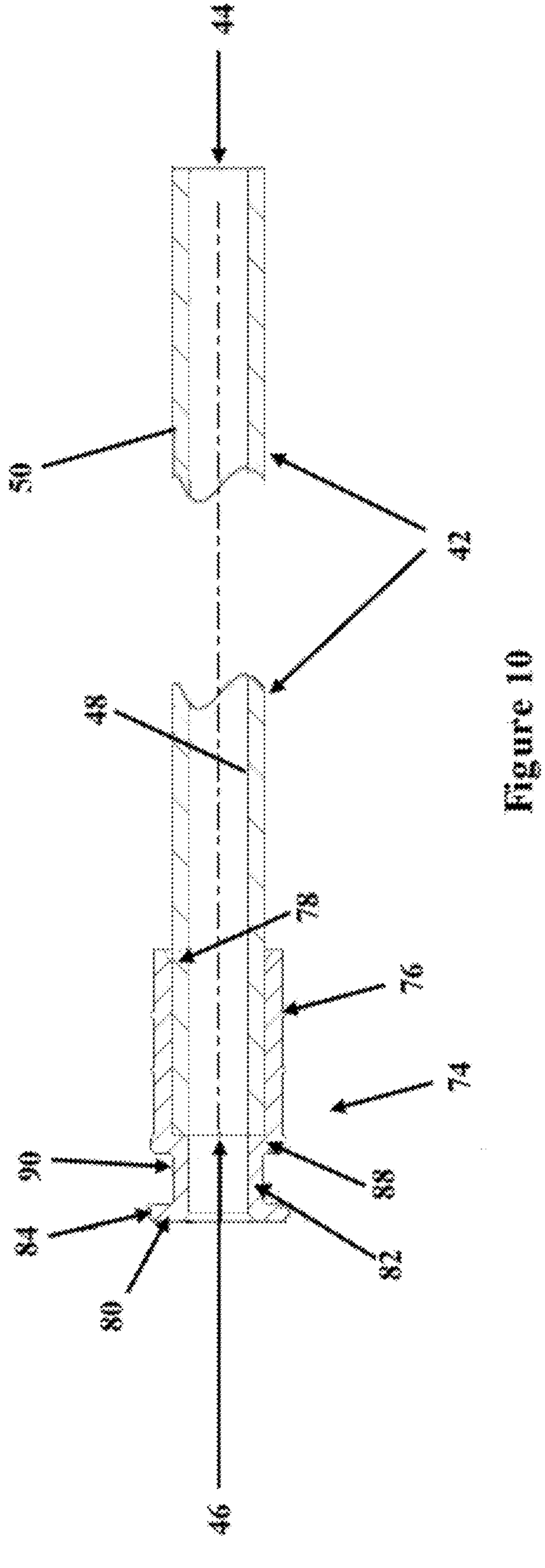
FIG. 10 is a side cross-sectional view of the inner hose of FIG. 9.

An exemplary embodiment of a faucet system 500 is shown in FIG. 4. The system 500 includes one or more supply hoses configured to supply one or more fluids to the faucet 10. In an exemplary embodiment, the faucet system 500 includes the wand hose 30 configured to separately provide two fluids via two separate flow paths to the wand 20 of the faucet 10. The wand hose 30 may be positioned and configured to supply a first fluid, such as a continuously pressurized fluid, via a first flow path to the wand 20. The wand hose 30 may also be positioned and configured to supply a second fluid via a second flow path to the wand 20. In an exemplary embodiment, the first fluid is filtered water, such as continuously pressurized filtered water, from the filter system 300. In other embodiments, the treated water may be heated, sterilized (e.g., via ultraviolet sterilization), fluoridated, pH corrected, softened/hardened, or other treated water. The wand hose 30 may also be positioned and configured to supply a second fluid different from the first fluid via a second flow path to the wand 20. The second fluid may be mixed water from the mixed water hose 22.

In an exemplary embodiment, the downstream end of the wand hose 30 is connected to an upstream end of the wand 20 to provide two fluids to the wand 20. In the illustrated embodiment, an upstream end of the wand hose 30 is fluidly connected to a downstream end of a connector 200 configured to supply a first fluid supply and a second fluid supply to the wand hose 30. Upstream ends of the connector 200 may be fluidly connected to the filter outlet 306 of the filter system 300 and to a downstream end of the mixed water hose 22. The downstream end of the connector 200 may have an outlet configured to supply the contents of the filter system 300 and the mixed water hose 22 to the wand hose 30. However, it will be understood that the upstream end of the wand hose 30 may be connected to other sources, directly or indirectly.

An exemplary embodiment of the wand hose 30 is shown in FIGS. 5-10. The wand hose 30 includes an outer hose 32 and an inner hose 42 disposed within and extending longitudinally through the outer hose 32. The outer hose 32 has an outer hose inlet 34 at an upstream end and an outer hose outlet 36 at a downstream end. The inner hose 42 has an inner hose inlet 44 at an upstream end and an inner hose outlet 46 at a downstream end. In an exemplary embodiment, the inner hose 42 is axially longer than the outer hose 32 such that the inner hose inlet 44 of the inner hose 42 is disposed upstream of the outer hose inlet 34 of the outer hose 32 and the inner hose outlet 46 of the inner hose 42 is disposed downstream of the outer hose outlet 36 of the outer hose 32. In an exemplary embodiment, the outer hose 32 and inner hose 42 comprise polyethylene, such as polyethylene of raised temperature (PERT) or cross-linked polyethylene (PEX). In other embodiments, the outer hose 32 and inner hose 42 comprise polyurethane, silicone, ethylene propylene diene monomer (EPDM), polypropylene, or polyvinyl chloride (PVC), or combinations thereof.

The outer hose 32 may be substantially tubular with an inner surface 38 and an outer surface 40 extending the length of the outer hose 32. The inner hose 42 may also be substantially tubular with an inner surface 48 and an outer surface 50 extending the length of the inner hose 42. The outer surface 50 of the inner hose 42 has a diameter less than a diameter of the inner surface 38 of the outer hose 32. In some embodiments, the outer hose 32 and inner hose 42 are sized, shaped, and configured such that the inner hose 42 may flex, bend, move laterally, slide, translate, etc. within the outer hose 32. In some embodiments, the inner hose 42 is thinner and/or comprises a more flexible or resilient material than the outer hose 32 and may be continuously pressurized.

The inner surface 48 of the inner hose 42 defines or otherwise includes a first or inner flow path 52 extending through the wand hose 30 from the inner hose inlet 44 to the inner hose outlet 46. The first flow path 52 may extend through the interior of the inner hose 42 (e.g., within the inner surface 48 of the inner hose 42). The wand hose 30 also includes a second or outer flow path 54 extending from the outer hose inlet 34 to the outer hose outlet 36. The second flow path 54 may extend between the exterior of the inner hose 42 and the outer hose 32 (e.g., between the outer surface 50 of the inner hose 42 and the inner surface 38 of the outer hose 32). The inner hose 42 may be continuous such that the first flow path 52 is disposed within the wand hose 30 and separate from the second flow path 54 (e.g., not in fluid communication with the second flow path 54). The second flow path 54 may substantially surround the first flow path 52 (e.g., substantially surround the inner hose 42). The inner hose 42 and the outer hose 32 may be sized, shaped, and configured such that fluid, such as water, may flow simultaneously and separately through the first and second flow paths 52, 54. The wand hose 30 may be configured such that the inner hose 42 may slide or translate upstream and downstream relative to the outer hose 32 and may rotate independently of the outer hose 32, such as when fluid is received in the first flow path 52 and/or the second flow path 54.

In some embodiments, the wand hose 30 is sized, shaped, and configured such that the inner hose 42 may be continuously pressurized with fluid. For example, the wand hose 30 may be sized, shaped, and configured such that the inner hose 42 may be continuously pressurized and does not substantially expand or contract radially during or after use while still providing a flow of fluid through the second flow path 54 and permitting the wand hose 30 to be manipulated, such as by a user.

In the illustrated embodiment, the wand hose 30 includes a single inner hose 42 extending through the outer hose 32. However, it will be understood that the wand hose 30 may have other configurations. In other embodiments, the wand hose 30 includes two or more inner hoses extending through the outer hose 32. Each of the inner hoses may define a separate flow path through the wand hose 30, such as for separate fluids. For example, the wand hose 30 may include more than two smaller hoses extending longitudinally through the outer hose 32, such as to provide more than two fluids to the wand 20. In the illustrated embodiment, the second flow path 54 is defined by the outer surface 50 of the inner hose 42 and the inner surface 38 of the outer hose 32. In other embodiments, the second flow path 54 is defined by another hose, such as a smaller hose, extending longitudinally through the outer hose 32.

The downstream end of the outer hose 32 may be coupled with the wand 20 at a first location and the downstream end of the inner hose 42 may be coupled with the wand 20 at a second location. The downstream end of the inner hose 42 may be coupled with the wand 20 such that the downstream end of the first flow path 52 is in fluid communication with a first waterway of the wand 20. The downstream end of the outer hose 32 may be coupled with the wand 20 such that the downstream end of the second flow path 54 is in fluid communication with the second waterway of the wand 20.

In some embodiments, the inner hose 42 is fluidly coupled with the filter system 300 such that the first flow path 52 of the wand hose 30 receives filtered water. The wand hose 30 may supply filtered watered to the first waterway of the wand 20. In some embodiments, the wand hose 30 supplies a continuously pressurized supply of filtered water to the first waterway of the wand 20.

In some embodiments, the wand hose 30 is fluidly coupled with the mixed water hose 22 such that the second flow path 54 of the wand hose 30 receives mixed water. The wand hose 30 may supply mixed water, such as in an amount and at a temperature set by a user, to the second waterway of the wand 20.

In some embodiments, the wand hose 30 is also fluidly coupled with the treated fluid supply such that the first flow path 52 of the wand hose 30 receives treated water, such as filtered water, which may be provided in a continuously pressurized supply. The wand hose 30 may supply the treated water to the first waterway of the wand 20.

Figure 11:
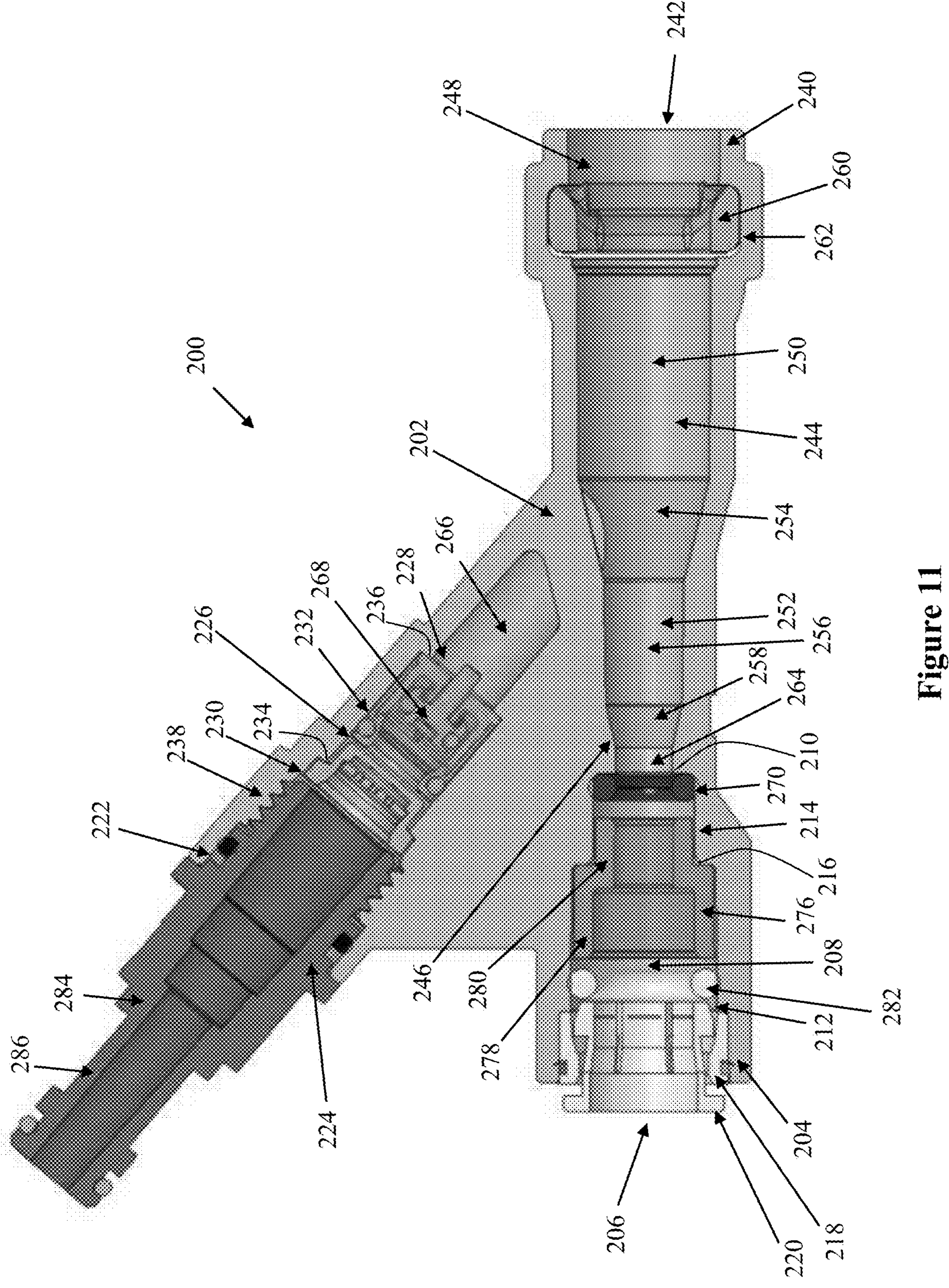
FIG. 11 is a side cross-sectional view of the connector of FIG. 4.
Figure 12:
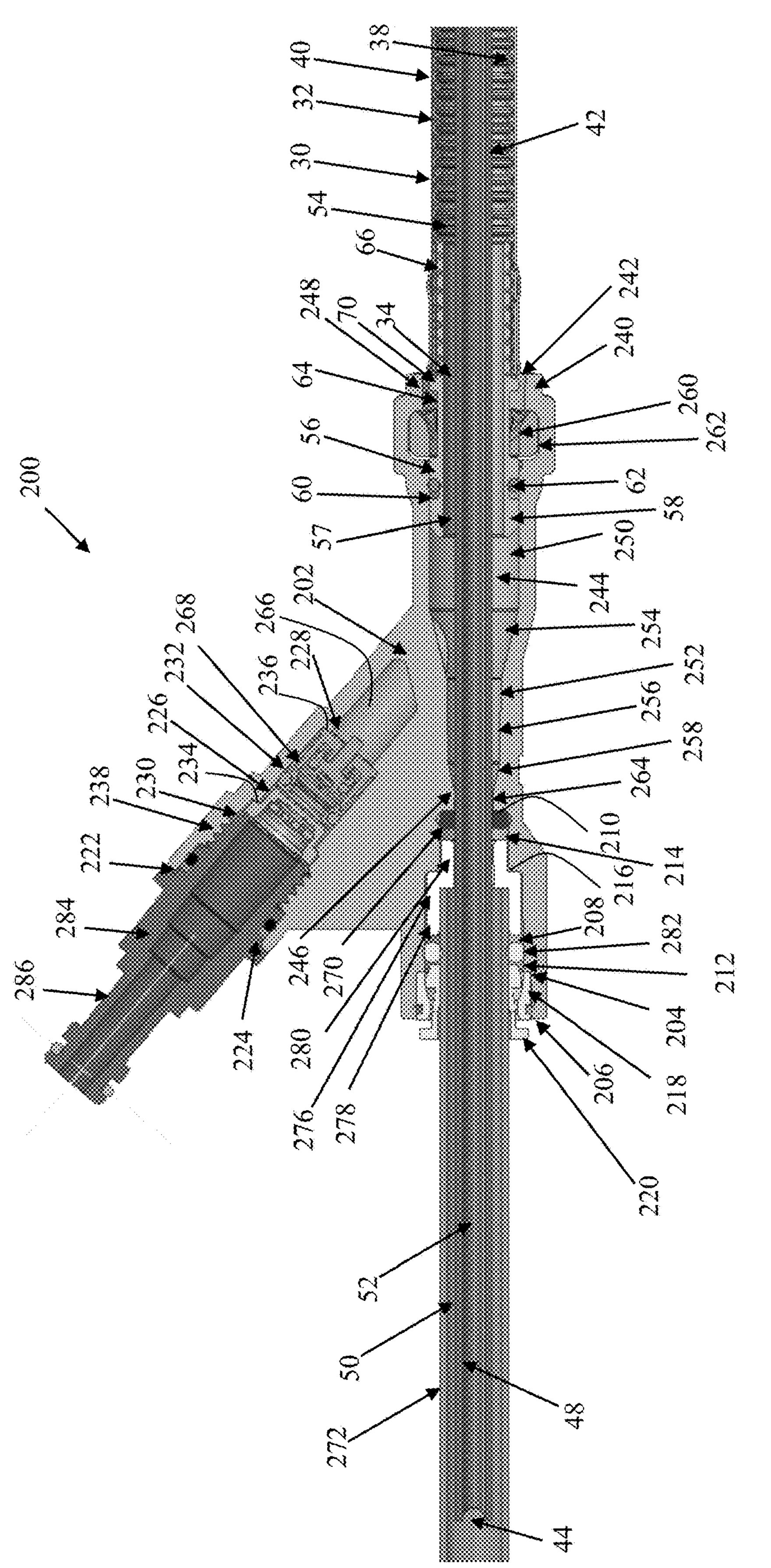
FIG. 12 is a side cross-sectional view of the wand hose of FIG. 5 coupled with the connector of FIG. 11.

Referring now to FIGS. 11-12, an exemplary embodiment of a connector 200 for providing two flow paths to a faucet is depicted. The connector 200 may be configured to couple with an upstream end of the wand hose 30 such that a first fluid may be provided to the wand 20 via the first flow path 52 and a second fluid may be provided to the wand 20 via the second flow path 54. As illustrated, the connector 200 includes a body 202, a first inlet portion 204 for receiving a first supply hose, a second inlet portion 222 for receiving a second supply hose, and an outlet portion 240 for coupling with a third hose, such as the wand hose 30 coupled with the wand 20 of the faucet, as detailed below. The first and second inlet portions 204, 222 may each be upstream of the outlet portion 240.

The first inlet portion 204 includes a first inlet 206 in the body 202 and extending inwardly into a first bore 208. The second inlet portion 222 includes a second inlet 224 in the body 202 and extending inwardly into a second bore 226. The outlet portion 240 includes an outlet 242 extending inwardly into a third bore 244. The first inlet 206, second inlet 224, and outlet 242 may be sized, shaped, and configured to receive or otherwise couple with a hose or other conduit. The third bore 244 may be sized, shaped, and configured to couple with an upstream end of the wand hose 30, such as an upstream end of the outer hose 42, as detailed below.

The first bore 208 may extend from the first inlet 206 substantially toward the outlet 242. The third bore 244 may extend from the outlet 242 substantially toward the first inlet 206. The second bore 226 may extend from the second inlet 224 toward a portion of the third bore 244, such as a middle portion of the third bore 244. In the illustrated embodiment, the first inlet 206 is disposed in the bottom left of the body 202 with the first bore 208 extending toward the right, the outlet 242 is disposed in the bottom right of the body 202 with the second bore 226 extending toward the left, and the second inlet 224 is disposed in the top of the body 202 with the second bore 226 extending toward the bottom right. However, the connector 200 may have other shapes and configurations. In another exemplary embodiment, the first inlet 206 is disposed in the bottom of the body 202 with the first bore 208 extending upwardly, the outlet 242 is disposed in the top of the body 202 with the third bore 244 extending downwardly, and the second inlet 224 is disposed in the left or right of the body 202 with the second bore 226 extending upwardly and toward the third bore 244.

The first bore 208 of the first inlet portion 204 may extend downstream or inwardly from the first inlet 206 to a terminal portion 210 downstream from the first inlet 206. The first bore 208 may include a first portion 212 extending downstream or inwardly from the first inlet 206. The first portion 212 may have a diameter substantially equal to diameter of the first inlet 206. The first bore 208 may also include a second portion 214 downstream from the first portion 212 and extending downstream or inwardly from the first portion 212 to the terminal portion 210. The first and second portions 212, 214 may be cylindrical and the second portion 214 may have a diameter less than a diameter of the first portion 212. The first bore 208 may also include a first shoulder 216 extending perpendicularly to the first inlet 206. The first shoulder 216 may extend radially inwardly from a downstream end of the first portion 212 to an upstream end of the second portion 214. The first shoulder 216 may be configured to abut a terminal end of a supply hose or hose cap inserted into the first inlet portion 204.

The first inlet portion 204 may also include a first coupler 218 for operatively coupling with a hose disposed in the first inlet portion 204. In an exemplary embodiment, the first coupler 218 is a snap or press fit coupler configured to couple with a hose inserted into the first inlet portion via a push-to-connect, snap, or press fitting. In another exemplary embodiment, the first coupler 218 is a threaded bore which may threadingly couple with threads on a downstream end of a hose inserted into the first inlet portion 204. The first coupler 218 may also include a release 220 configured to decouple the first coupler 218 from the supply hose. In the illustrated embodiment, the release 220 is a pivotably flange or finger extending out of the first inlet 206 and configured to pivot radially outwardly thereby decoupling the hose from the first inlet portion 204.

The second bore 226 of the second inlet portion 222 may extend downstream or inwardly from the second inlet 224 to a terminal end 228. The second bore 226 may include a first portion 230 extending downstream or inwardly from the second inlet 224. The first portion 230 may have a diameter substantially equal to the diameter of the second inlet 224. The second bore 226 may include a second portion 232 downstream from the first portion 230 and extending downstream from the first portion 230 to the terminal end 228. The second portion 232 may have a diameter less than the diameter of the first portion 230. The first and second portions 230, 232 may be substantially cylindrical.

The second bore 226 may include a second shoulder 234 extending perpendicularly from the second inlet 224. The second shoulder 234 may extend radially inward from a downstream end of the first portion 230 to an upstream end of the second portion 232. The second shoulder 234 may be configured to abut a portion of a supply hose or conduit, such as an end cap of the supply hose or conduit, inserted into the second inlet portion 222.

The second bore 226 may also include a third shoulder 236 at the terminal end 228 and extending radially inward from a downstream end of the second portion 232. The third shoulder 236 may extend substantially perpendicular to the second inlet 224. The third shoulder 236 may configured to abut and retain a valve or flow restrictor, as described below.

The second bore 226 may include a second coupler 238 for operatively coupling with a supply hose. The second coupler 238 may be disposed in the first portion 230 of the second bore 226. The second coupler 238 may be disposed within the first portion 230 of the second bore 226 such that end of a hose inserted into the second inlet portion 222 and coupled with the second coupler 238 may abut the second shoulder 234 of the second inlet portion 222. In the illustrated embodiment, the second coupler 238 is a threaded bore for threadingly coupling with the threads of a supply hose. In another embodiment, the second coupler 238 is a snap or press fit coupler similar to the first coupler 218.

The third bore 244 of the outlet portion 240 may extend upstream or inwardly from the outlet 242 to a terminal end 246. The terminal end 246 of the third bore 244 may have a diameter less than a diameter of the outlet 242. The third bore 244 may include a first portion 248 at a downstream end of the third bore 244 extending upstream from the outlet 242. The first portion 248 may be sized, shaped, and configured to receive at least one hose or other conduit, such as the outer hose 32 of the wand hose 30. In some embodiments, the first portion 248 has a diameter that is larger than a diameter of the hose(s) be received in the outlet portion 240. For example, the first portion 248 may be sized, shaped, and configured to receive an upstream end of the wand hose 30 and the first portion 248 may have a diameter greater than the diameter of outer hose 32.

The third bore 244 may also include a second portion 250 upstream of the first portion 248 and extending upstream toward the terminal end 246 of the third bore 244. The second portion 250 may be configured to receive a portion of one of the hoses inserted into the third bore 244. The second portion 250 may be substantially cylindrical and have a diameter substantially equivalent to a diameter of an outside portion of an end of a hose inserted into the third bore 244. For example, the second portion 250 may be configured to receive the outer hose 32 and may have a diameter substantially equivalent to the diameter of the outer hose 32.

The third bore 244 may also include a third portion 252 extending from an upstream end of the second portion 250 to the terminal end 246 of the third bore 244. The third portion 252 may be configured to prevent or restrict fluid from flowing upstream in the third bore 244. In the illustrated embodiment, the third portion 252 includes a first tapered portion 254 extending upstream from an upstream end of the second portion 250, a cylindrical portion 256 extending upstream from an upstream end of the first tapered portion 254, and a second tapered portion 258 extending upstream from an upstream end of the cylindrical portion 256 to the terminal end 246 of the third bore 244. However, it will be understood that the third portion 252 of the third bore 244 may have any suitable size, shape, and configuration. For example, the third portion 252 may include a single tapered portion extending from an upstream end of the second portion 250 to the terminal end 246.

The outlet portion 240 may include or be coupled to a third coupler 260 disposed in the third bore 244 configured to operatively retain a hose or conduit inserted into the outlet portion 240. For example, the third coupler 260 may be sized, shaped, and configured to operatively retain an upstream end of the outer hose 32. In one embodiment, the third coupler 260 is a snap or press fit ring or seal which is configured to operatively seal around a portion of a hose inserted into the third bore 244 and retain the supply hose in the outlet portion 240. For example, the third coupler 260 may be configured to operatively seal around the outer surface 40 of the outer hose 30 when the upstream end of the outer hose 30 is inserted into the third bore 244, as detailed below. The third coupler 260 may be resilient such that the third coupler 260 may compress or otherwise deform when an upstream portion of the hose with a larger diameter is inserted into the third bore 244 and expand to abut and seal a portion of the hose with a smaller diameter after the larger diameter portion has passed upstream of the third coupler 260. The abutment between the third coupler 260 and the smaller diameter portion of the hose may operatively retain the hose in the third bore 244. In other embodiments, the third coupler 260 may be a threaded bore for threading coupling with threads of a supply hose or a snap or press fit coupler similar to the first coupler 218. For example, the third coupler 260 may be configured to threadingly engage with threads disposed on the outer surface 40 of the outer hose 32 at or near an upstream end of the outer hose 32.

The third coupler 260 may be disposed in a recess 262 in the first portion 248 of the third bore 244. The recess 262 may be upstream of the outlet 242 and have a diameter larger than the diameter of the first portion 248 of the third bore 244. The recess 262 may be sized, shaped, and configured such that the third coupler 260 may be disposed in the recess 262 and extend radially inwardly into the third bore 244. In some embodiments, the third coupler 260 and the recess 262 are configured such that the third coupler 260 extends radially inwardly into the third bore 244 beyond an inner surface of the second portion 250 of the third bore 244.

The connector 200 also includes a first passage 264 connecting the first bore 208 with the third bore 244 and a second passage 266 connecting the second bore 226 with the third bore 244. The first passage 264 may be configured to direct or otherwise allow the contents received by the first inlet portion 204 to flow to the outlet portion 240. The second passage 266 may be configured to direct or otherwise allow the contents received by the second inlet portion 222 to flow to the outlet portion 240. The first passage 264 may extend from a terminal end of the first bore 208 to a terminal end of the third bore 244. The second passage 266 may extend from a terminal end of the second bore 226 into a side portion of the third bore 244.

The first passage 264 may extend downstream from the terminal portion 210 of the first bore 208 to the terminal end 246 end of the third bore 244 such that the first bore 208 is in communication with the third bore 244, such as in fluid connection. The first passage 264 may be substantially cylindrical and may extend along a longitudinal axis extending through the first bore 208 and third bore 244 such that the first inlet 206, the first passage 264, and the outlet 242 are substantially aligned. In some embodiments, the diameter of the first passage 264 is substantially equivalent to the diameter of a hose inserted through the first passage 264 from the third bore 244 to the first bore 208, as described below. For example, the first passage 264 may be configured to receive the inner hose 42 therethrough and the diameter of the first passage 264 may be substantially equivalent to the diameter of the outer surface 50 of the inner hose 42, as detailed below.

The second passage 266 may extend downstream from the terminal end 228 of the second bore 226 to a side portion of the third bore 244 such that the second bore 226 is in communication with the third bore 244, such as in fluid connection. The second passage 266 may extend from the terminal end 228 of the second bore 226 into a portion of the third bore 244 that is downstream from the terminal end 246 of the third bore 244. For example, the second passage 266 may extend upstream from the terminal end 228 of the second bore 226 into a side wall or surface of the third portion 252 of the third bore 244. In the illustrated embodiment, the second passage 266 extends from the terminal end 228 of the second bore 226 into the first tapered portion 254 of the third bore 244. The second passage 266 may be substantially cylindrical with a diameter less than the diameter of the second portion 232 of the second bore 226.

The second bore 226 may also include a check valve 268 configured to operatively couple with the downstream end of a supply hose, such as the valve stem of the supply hose. An outlet of the check valve 268 may extend into the second passage 266. The check valve 268 may be configured to prevent fluid from the second passage 266 or the third bore 244 from flowing upstream into the second bore 226.

As shown in FIG. 12, the wand hose 30 and the connector 200 may be configured such that the wand hose 30 may be coupled the connector 200 to provide a supply of contents received by the first and second inlet portions 204, 222 of the connector 200 to a destination, such as to the wand 20 of the faucet 10. The wand hose 30 may be coupled with the connector 200 such that a supply of a first fluid is provided (e.g., directed) to the first flow path 52 of the wand hose 30 and such that a supply of a second fluid is provided (e.g., directed) to the second flow path 54 of the wand hose 30. The upstream end of the outer hose 32 may be connected to or otherwise coupled with the outlet portion 240 of the connector 200 and the downstream end of the outer hose 32 may be connected to or otherwise coupled with an upstream portion of the wand 20 of the faucet 10 to provide a supply of fluid to the wand 20. The upstream end of the inner hose 42 may be positioned upstream of the third bore 244 and the downstream end of the inner hose 42 may be connected or otherwise coupled with the upstream portion of the wand 20 of the faucet 10 to provide a supply of a different fluid to the wand 20.

The wand hose 30 may be coupled with the outlet portion 240 of the connector 200 to provide fluid(s) to the downstream end of the wand hose 30, such as to the wand 20. The upstream end of the wand hose 30 may at least partially extend into the third bore 244 of the connector 200 and be operatively retained by the third coupler 260. The wand hose 30 may be disposed in the connector 200 such that the outer hose inlet 34 may receive fluid passing through the third bore 244. The outer hose inlet 34 of the wand hose 30 may be disposed downstream of the first passage 264 and the second passage 266 of the connector 200 when the outer hose 32 is coupled with the connector 200.

The outer hose inlet 34 of the outer hose 32 may be in fluid communication with an outlet passage or bore, such as the third bore 244, of the connector 200 such that the fluid in the outlet bore (e.g., the third bore 244) may be provided into the second flow path 54 of the wand hose 30. For example, the mixed water hose 22 may be fluidly coupled with the third bore 244 of the connector 200 such that mixed water from the mixed water hose 22 is provided to the second flow path 54 of the wand hose 30. The outer hose outlet 36 of the outer hose 32 may be in fluid communication with one of the waterways of the wand 20, such as a mixed water waterway, such that the fluid in the second flow path 54 of the wand hose 30 may be provided from the wand 20. For example, the downstream end of the outer hose 32 may be connected with the upstream end of the wand 20 such that the second flow path 54 of the wand hose 30 provides mixed water to a waterway of the wand 20 that is separate from a waterway fluidly connected to the first flow path 52 of the wand hose 30.

The upstream end of the inner hose 42 may be coupled with or extend through the connector 200 at a location upstream of the outer hose inlet 34 of the outer hose 32. The downstream end of the inner hose 42 may be connected to or otherwise coupled with the wand 20 downstream of the outer hose outlet 36 of the outer hose 32. The upstream end of the inner hose 42 may extend upstream of the upstream end of the outer hose 32 into and/or through the connector 200 such that the inner hose inlet 44 of the inner hose 42 is in fluid communication a fluid source different than the fluid source in communication with the second flow path 54. The upstream end of the inner hose 42 may extend upstream from the connection between the outer hose 32 and the connector 200, upstream from the third bore 244 of the connector 200, and out of the first bore 208 of the connector 200 to fluidly couple with the filter system 300. In some embodiments, the inner hose 42 extends upstream of the connector 200 and is connected or otherwise coupled with the filter outlet 306. In other embodiments, the inner hose 42 may be disposed in the connector 200 such that the upstream end of the inner hose 42 is longitudinally movable or translatable (e.g., upstream and downstream) within the connector 200, such as being disposed within a supply hose connecting the filter 302 and the connector 200. The inner hose 42 may be fluidly coupled with the filter system 300 such that filtered water, such as continuously pressurized filtered water, from the filter system 300 is provided to the first flow path 52 of the wand hose 30.

When the wand hose 30 is coupled with the connector 200, a first fluid may be provided to the first flow path 52 of the wand hose 30 and a second fluid may be provided to the second flow path 54 of the wand hose 54. The inner hose 42 may extend at least into the first bore 210 of the connector 200 to receive a supply of a first fluid, such as treated water. In some embodiments, the inner hose 42 extends upstream beyond the connector 200 and couples with the filter system 300. The inner hose 42 may receive a continuously pressurized supply of the first fluid. The second inlet 224 of the connector 200 may be coupled with the downstream end a supply hose, such as the mixed water hose 22, to provide a supply of a second fluid to the second flow path 54 of the wand hose 30. The second fluid may flow from the supply hose (e.g., the mixed water hose 22) into the second bore 226, through the second passage 266, into the third bore 244, into the outer hose inlet 34, and through the second flow path 54 of the wand hose 30. The inner hose 42 extends upstream beyond the third bore 244 such that the second fluid flows from the second passage 266 into the third bore 244, around the inner hose 42, and out of the third bore 244 between the outer surface 40 of the inner hose 42 and the inner surface 38 of the outer hose 32 (e.g., does not enter the first flow path 52 of the wand hose 30). The inner hose 42 may extend upstream beyond the third bore 244 such that the second fluid in the third bore 244 does not enter the first flow path 52. The connector 200 may form a fluid tight seal around the inner hose 42 upstream of the third bore 244 such that the first fluid does not flow into the third bore 244 or the second flow path 54 of the wand hose 30.

As shown in FIGS. 6-12, the wand hose 30 and the connector 200 may be sized, shaped, and configured such that the wand hose 30 may couple with the connector 200 in a substantially secure manner. The upstream end of the outer hose 32 may include or be coupled with an upstream outer hose fitting or cap 56 configured to be operatively secured in an outlet of the connector 200, such as the third bore 244 of the connector 200. The upstream outer hose fitting 56 may be sized, shaped, and configured such that the wand hose 30 and the connector 200 form a fluid tight seal when the outer hose 32 is secured in the third bore 244 of the connector 200. The upstream outer hose fitting 56 may be sized, shaped, and configured to be operatively secured in the third bore 244 of the connector 200. In some embodiments, the upstream outer hose fitting 56 is laser welded to the outer surface 40 of the outer hose 32. In other embodiments, the upstream outer hose fitting 56 is attached to the outer surface 40 of the outer hose 32 with fasteners, adhesives, etc.

The upstream outer hose fitting 56 includes a fitting flow path 57 extending through the upstream outer hose fitting 56 from the upstream end to the downstream end. The fitting flow path 75 may be sized, shaped, and configured such that the inner hose 42 may extend therethrough and such that fluid from the third bore 244 may flow around the inner hose 42, through the fitting flow path 57 and through the second flow path 54 of the wand hose 30.

The upstream outer hose fitting 56 may also include an insertion portion 58 at an upstream end configured to be inserted into an outlet bore or opening of the connector 200, such as the third bore 244. The insertion portion 58 may be substantially circular and have an outer circumference with a radial diameter substantially equal to the diameter of the third bore 244 of the connector 200 such that the insertion portion 58 substantially seals the third bore 244 of the connector 200 when the upstream end of the outer hose 32 is inserted into the third bore 244. In some embodiments, the insertion portion 58 of the upstream outer hose fitting 56 has an outer diameter substantially equal to the diameter of the second portion 250 of the third bore 244. An outer surface of the insertion portion 58 may form a substantially fluid seal with the inner surface of the second portion 250 of the third bore 244. In some embodiments, the upstream end of the insertion portion 58 is tapered to facilitate insertion of the upstream outer hose fitting 56 into the third bore 244 of the connector 200.

The insertion portion 58 may also include a recessed portion 60 inset in the outer surface of the insertion portion 58 and having a reduced outer circumference from the remainder of the insertion portion 58. The recessed portion 60 may be spaced apart from the upstream end of the insertion portion 58. The recessed portion 60 may be a groove in the outer surface of the insertion portion 58. The upstream outer hose fitting 56 may also include a first seal 62 disposed in the recessed portion 60. The first seal 62 may be configured to provide a fluid seal between the outer circumference of the insertion portion 58 and the third bore 244 of the connector 200 when the upstream outer hose fitting 56 is inserted into the third bore 244. In an exemplary embodiment, the first seal is an O-ring type seal.

The upstream outer hose fitting 56 may include a retention portion 64 downstream of the insertion portion 58. The retention portion 64 may be configured to securely retain the wand hose 30 in the connector 200. The retention portion 64 may have an outer circumference that is radially smaller than the outer circumference of the insertion portion 58. The retention portion 64 may be configured to receive and abut the third coupler 260 of the connector 200 when the third coupler 260 is in the expanded configuration, thereby securing the upstream outer hose fitting 56 in the third bore 244. When the upstream outer hose fitting 56 is inserted into the third bore 244, the outer surface of the insertion portion 58 may compress the third coupler 260 and the upstream outer hose fitting 56 may be inserted farther upstream into the third bore 244 of the connector 200. After the insertion portion 58 is moved upstream of the third coupler 260, the third coupler 260 may move to the expanded configuration and be disposed in and/or abut an outer surface of the retention portion 64 of the upstream outer hose fitting 56. The third coupler 260 may then restrict or prevent the insertion portion 58 from being retracted past the third coupler 260. For example, the third coupler 260 may extend partially into the retention portion 64 and may abut side walls of the retention portion 64 to prevent or restrict translation of the outer hose 30 relative to the connector 200. In some embodiments, the third coupler 260 also provides a fluid seal around the upstream outer hose fitting 56 when the third coupler 260 is received in and/or in abutment with the retention portion 64.

The upstream outer hose fitting 56 may also include a coupling portion 66 downstream from the retention portion 64. The coupling portion 66 may be configured to couple or engage with the upstream end of the outer hose 32. The coupling portion 66 may extend downstream of the outlet 242 of the connector 200 when the upstream outer hose fitting 56 is retained in the third bore 244. The coupling portion 66 may have an outer surface with a diameter radially smaller than the outer circumference of the insertion portion 58 and substantially the same as the diameter of the inner surface 38 of the outer hose 32. The outer surface of the coupling portion 66 may be sized, shaped, and configured to fittingly couple with the inner surface 38 of the outer hose 32. The upstream end of the outer hose 32 may include a plurality of crimps 41 and the outer surface of the coupling portion 66 may have a plurality of detents for matingly receiving the plurality of crimps 41.

The upstream outer hose fitting 56 may further include a rib 70 disposed on an outer surface between the retention portion 64 and the coupling portion 66. The rib 70 may be configured to abut the upstream end of the outer hose 32. The rib 70 may extend radially outwardly from the outer surface of the coupling portion 66 to a distance which prevents the outer hose 32 from sliding upstream beyond the coupling portion 66 to the retention portion 64 or the insertion portion 58 when the outer hose 32 is engagingly disposed on the downstream end of the upstream outer hose fitting 56.

In some embodiments, the upstream outer hose fitting 56 also includes an outer hose coupler 72 disposed downstream of the rib 70 and configured to couple with the outer surface 50 of the outer hose 32. The outer hose coupler 72 may extend downstream from the rib 70 and bias the outer hose 32 radially inwardly toward the coupling portion 66. For example, the outer hose coupler 72 may form a press fit engagement with the outer surface 50 of the outer hose 32 when the outer hose 32 is disposed on the upstream outer hose fitting 56.

The inner hose 42 may extend into or through the first passage 264 of the connector 200 when the outer hose 32 is coupled with the third bore 244 of the connector 200. The inner hose 42 may extend upstream from a point downstream of the outlet 242, into the third bore 244, through the first passage 264 and into the first bore 208 such that the inner hose inlet 44 is fluidly coupled with a treated fluid supply (e.g., the filter system 300) and may receive a supply of treated fluid, such as a continuously pressurized supply of treated fluid. In other embodiments, the upstream end of the inner hose 42 is freely disposed upstream of the terminal portion 210 of the first bore 208. The inner hose inlet 44 of the inner hose 42 may be directed or oriented upstream of the first passage 264. In some embodiments, the inner hose 42 extends partially out of the first inlet 206 such that the inner hose inlet 44 of the inner hose 42 is disposed upstream of the first inlet 206.

In an exemplary embodiment, the upstream end of the inner hose 42 may be coupled with the filter outlet 306 of the filter 302, as detailed below. The upstream end of the inner hose 42 may extend through the connector 200 (e.g., upstream beyond the first bore 208 of the connector 200) and couple with the filter 302 to receive filtered water, such as continuously pressurized filtered water. For example, the upstream end of the inner hose 42 may also include a hose coupler and couple with the filter 302 similarly to how the outer hose 32 couples with the connector 200.

In other embodiments, the upstream end of the inner hose 42 is relatively free or unsecured when the wand hose 30 is coupled with the connector 200. The upstream end of the inner hose 42 may extend upstream from the outlet passage of the connector 200 through a passage of the connector 200. For example, the upstream end of the inner hose 42 may be disposed upstream of the inlet of the connector 200 fluidly coupled with the filter system 300, such as being disposed in the supply hose fluidly coupling the filter outlet 306 to the connector 200. In some embodiments, the upstream end of the inner hose 42 is coupled with a protective cap. The upstream end of the inner hose 42 may be disposed within a protective hose or tube disposed between the first bore 208 of the connector 208 and the filter 306, as detailed below.

A portion of the inner hose 42 downstream from the inner hose inlet 44 may be received through the upstream outer hose fitting 56 and outer hose 32 of the wand hose 30. The outer surface 50 of the inner hose 42 has a diameter which is less than the diameters of the inner surfaces of the upstream outer hose fitting 56 and outer hose 32 of the wand hose 30 such that a fluid may flow through the wand hose 30 between the inner surface 38 of the outer hose 32 and the outer surface 50 of the inner hose 42 (e.g., through the second flow path 54).

The diameter of the outer surface 50 of the inner hose 42 may be substantially equivalent to a diameter of the first passage 264 such that there is a substantial fluid seal between outer surface 50 of the inner hose 42 and the first passage 264. In some embodiments, the inner hose 42 is disposed in (e.g., through) the first passage 264 such that the inner hose 42 may move or translate upstream and downstream within the first passage 264, such as based on pressures in the first bore 208 and/or the pressure in the inner hose 42. In other embodiments, the inner hose 42 may be securely retained in the first passage 264, such as via couplers, fasteners, adhesives, welding, or the like.

The first bore 208 of the first inlet portion 204 may include a hose seal 270 disposed at or near the terminal portion 210. The hose seal 270 may be configured to provide a fluid seal between an inner wall of the first bore 208 and the outer surface 50 of the inner hose 42 such that fluid does not flow around outer surface 50 of the inner hose 42 from the first bore 208 to the first passage 264. In some embodiments, the hose seal 270 is an O-ring type seal.

As shown in FIG. 12, the first inlet portion 204 may operatively couple with a first supply hose 272. In embodiments in which the upstream end of the inner hose 42 is coupled with the treated fluid supply (e.g., the filter system 300), the first supply hose 272 may be provided as a spacer which substantially surrounds the inner hose 42 between the treated fluid supply (e.g., filter system 300) and the first bore 244 of the connector 200. The first supply hose 272 may be provided to fill the first inlet portion 204 and to couple with coupling members of the first inlet portion 204, as described below. In embodiments in which the upstream end of the inner hose 42 is disposed between the first passage 264 and the treated fluid supply, the first supply hose 272 may direct contents from the treated fluid supply into the connector 200 and out of the outlet 242. The first supply hose 272 may include a sleeve fitting or cap configured to couple with the first coupler 218 of the first bore 208 and operatively secure the downstream end of the first supply hose 272 in the first bore 208. The sleeve fitting may be configured to snap or press fit with the first coupler 218 of the first bore 208 such that the distal end of the first supply hose 272 may be inserted into the first bore 208 past the first coupler 218 to prevent retraction of the first supply hose 272 from the first bore 208. In some embodiments, when the first supply hose 272 is coupled with the first inlet portion 204, the inner hose 42 partially extends into the first supply hose 272 such that the inner hose inlet 44 is disposed in the first supply hose 272. In such embodiment, the upstream end of the inner hose 42 may be relatively unsecured or free-floating within the first supply hose 272.

The first inlet portion 204 may also include a supply fitting 276 disposed in the first portion 212 and extending into the second portion 214. The supply fitting 276 may be configured to abut the end of the supply hose 272 inserted into the first bore 208 such that the supply fitting 276 forms a fluid tight seal around the downstream end of the first supply hose 272. The supply fitting 276 may have a first cap portion 278 disposed in the first portion 212 of the first bore 208 and a second cap portion 280 disposed in the second portion 214 of the first bore 208. The first cap portion 278 may have an outer diameter substantially equivalent to the diameter of the first portion 212 of the first bore 208 and an inner diameter substantially equivalent to an outer diameter of the first supply hose 272. The second cap portion 280 may have an outer diameter substantially equivalent to the diameter of the second portion 214 of the first bore 208 and an inner diameter substantially equivalent to outer surface 50 of the inner hose 42. An outside surface of the downstream end of the first cap portion 278 may be configured to abut the first shoulder 216 such that a force exerted by the contents of the first supply hose 272 on the supply fitting 276 biases the supply fitting 276 against the first shoulder 216.

The first inlet portion 204 may include an inlet seal 282 disposed between the first coupler 218 and the supply fitting 276 configured to provide a fluid seal between the first bore 208 and the first supply hose 272. In an exemplary embodiment, the inlet seal 282 is an O-ring type seal.

In an exemplary embodiment, the first supply hose 272 is used as a spacer to couple the treated fluid supply (e.g., the filter system 300) and the connector 200, such as to fill the first inlet portion 204 and couple with the supply fitting 276. The treated fluid from the treated fluid supply (e.g., filter system 300) may flow through the inner hose 42 through the connector 200 and toward the faucet 10, such as to an upstream portion of the wand 20. In other embodiments, the first supply hose 272 is coupled to the first inlet portion 204 such that the contents of the first supply hose 272 may flow toward the first bore 208, into the inner hose inlet 44 of the inner hose 42, downstream through the inner hose 42, and out the outlet 242. In some embodiments, the first supply hose 272 supplies a continuously pressurized supply of fluid, such as treated water, to the first inlet portion 204 such that the inner hose 42 provides continuously pressurized fluid out of the outlet portion 240 through the first flow path 52 through the wand hose 30. For example, the inner hose 42 or the first supply hose 272 may be connected to a filter to provide continuously pressurized filtered water through the connector 200. However, it will be understood that the inner hose 42 and/or the first inlet portion 204 may receive hoses and conduits with other contents, such as other treated water.

The second inlet portion 222 of the connector 200 may operatively couple with a second supply hose to provide contents from a second supply hose into the connector 200 and out of the outlet 242. The second supply hose may include or couple with a second supply connector 284 configured to operatively couple the second supply hose to the second inlet portion 222. The second supply connector 284 may include a connector configured to operatively couple with the second coupler 238 of the second bore 226. For example, the second supply connector 284 may include a plurality of threads which threadingly couple with second coupler 238. The second supply connector 284 may include a neck portion 286 configured to be received in and secure a downstream end of a hose sleeve of the second supply hose. The second supply connector 284 may include a flow path extending from an upstream end to a downstream end. The flow path may be configured to provide the contents of the second supply hose to the check valve 268.

The connector 200 may be configured to receive fluid, such as treated water, from a first fluid supply, such as a treated fluid supply (e.g., the filter system f300), through the first inlet portion 204, receive contents, such as mixed water, from a second fluid supply (e.g., mixed water hose 22) in the second inlet portion 222, and simultaneously output the contents of the first and second supplies via a single outlet 242. The contents of the first fluid supply may be output through the inner hose 42 and the contents of the second fluid supply may be output through a second flow path of wand hose 30 (e.g., outside the outer surface 50 of the inner hose 42) extending through the wand hose 30 such that the contents of the first and second supplies may be simultaneously supplied by a single hose without the contents of the two supplies mixing. For example, the connector 200 may simultaneously supply treated water, such as a continuously pressurized supply of filtered water, and mixed water to a faucet, such as to separate waterways in the wand, via a single hose without the treated water and mixed water mixing.

The wand hose 30 may be connected to the connector 200 to provide a first fluid via the first waterway 52 and a second fluid via the second waterway 54 to one or more downstream locations, such as to waterways in the wand 20. The inner hose 42 extends upstream from the first passage 264 to a point downstream of the outlet 242 such that fluid which flows through the second passage 266 does not enter the inner hose 42. In some embodiments, the inner hose 42 extends downstream the length of the wand hose 30 such that the downstream ends of the outer hose 32 and the inner hose 42 may extend to a downstream location, such as connected to the wand 20 or outlet of the faucet 10.

While the connector 200 has been described as having two inlet portions 204, 222 which couple with one outlet portion 240 to receive two separate hoses and provide a single outlet with two hoses, the connector 200 may have other configurations. For example, connector 200 may be configured with the two inlet portions 204, 222 as outlets and the outlet portion 240 as an inlet such that the connector 200 may have a single inlet for receiving two hoses (e.g., an outer hose and an inner hose) and provide two outlets to separate hoses. For example, the outlet portion 240 may be configured to receive a conduit or hose with an outer hose and inner hose and the connector 200 may direct the contents of the outer hose to the second inlet portion 222 and the contents of the inner hose to the first inlet portion 204.

Additionally, while the connector 200 has been described as having two inlet portions 204, 222, corresponding to the two hoses 32, 42 of the wand hose 30, it will be understood that the connector 200 may have other configurations. For example, in embodiments in which the wand hose 30 includes more than one inner hose, the connector 200 may include an additional number of inlets corresponding to the additional number of inner hoses such that each inner hose may extend through and be fluidly coupled with an inlet.

Further, while the inner hose 42 has been described as being in fluid communication with the filter system 300 to receive filtered water, such as continuously pressurized filtered water, it will be understood that in other embodiments, the inner hose 42 may be coupled with other treated water sources. For example, the upstream end of the inner hose 42 may be coupled with receive heated water, sterilized (e.g., via ultraviolet sterilization) water, fluoridated water, pH corrected water, or softened/hardened water, and the treated water may be continuously pressurized. In still further embodiments, the inner hose 42 may be coupled with fluid sources other than treated water sources, such as hot and cold water sources.

While the connector 200 has been described as being used with a faucet 10 with a wand 20 which may be pulled away from the body of the faucet 10, it will be understood that the connector 200 may be used in a different faucet system. For example, the connector 200 may be used with a faucet without a wand.

Referring now to FIGS. 4-10 and 13-17, the downstream end of the inner hose 42 may extend downstream of the downstream end of the outer hose 32 and into the wand 20 such that the inner hose outlet 46 of the inner hose 42 is in fluid communication with a waterway of the wand 20 different from the waterway in connection with the second flow path 54 of the wand hose 30. The downstream end of the inner hose 42 may extend downstream from the connection between the outer hose 32 and the wand 20, through the waterway in communication with the second flow path 54 of the wand hose 30, and into another waterway of the wand 20. For example, the downstream end of the wand hose 30 may be connected with an upstream end of the wand 20 such that the first flow path 52 of the wand hose 30 may provide treated water, such as continuously pressurized filtered water, to a first waterway of the wand 20 and the second flow path 54 of the wand hose 30 may provide mixed water to a second waterway of the wand 20, as described below.

Figure 13:
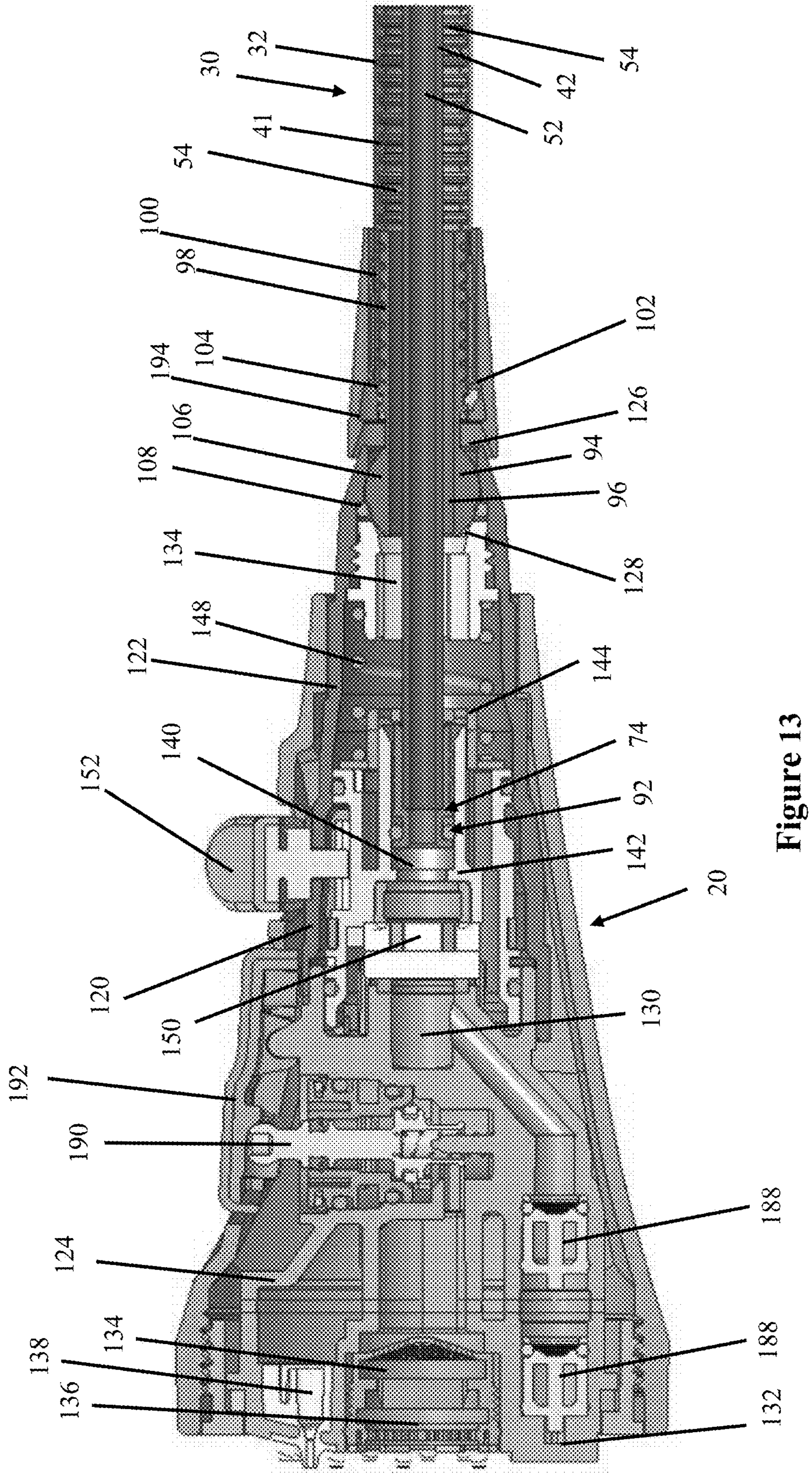
FIG. 13 is a side cross-sectional view of the wand hose of FIG. 5 coupled with the wand of FIG. 5.
Figure 14:
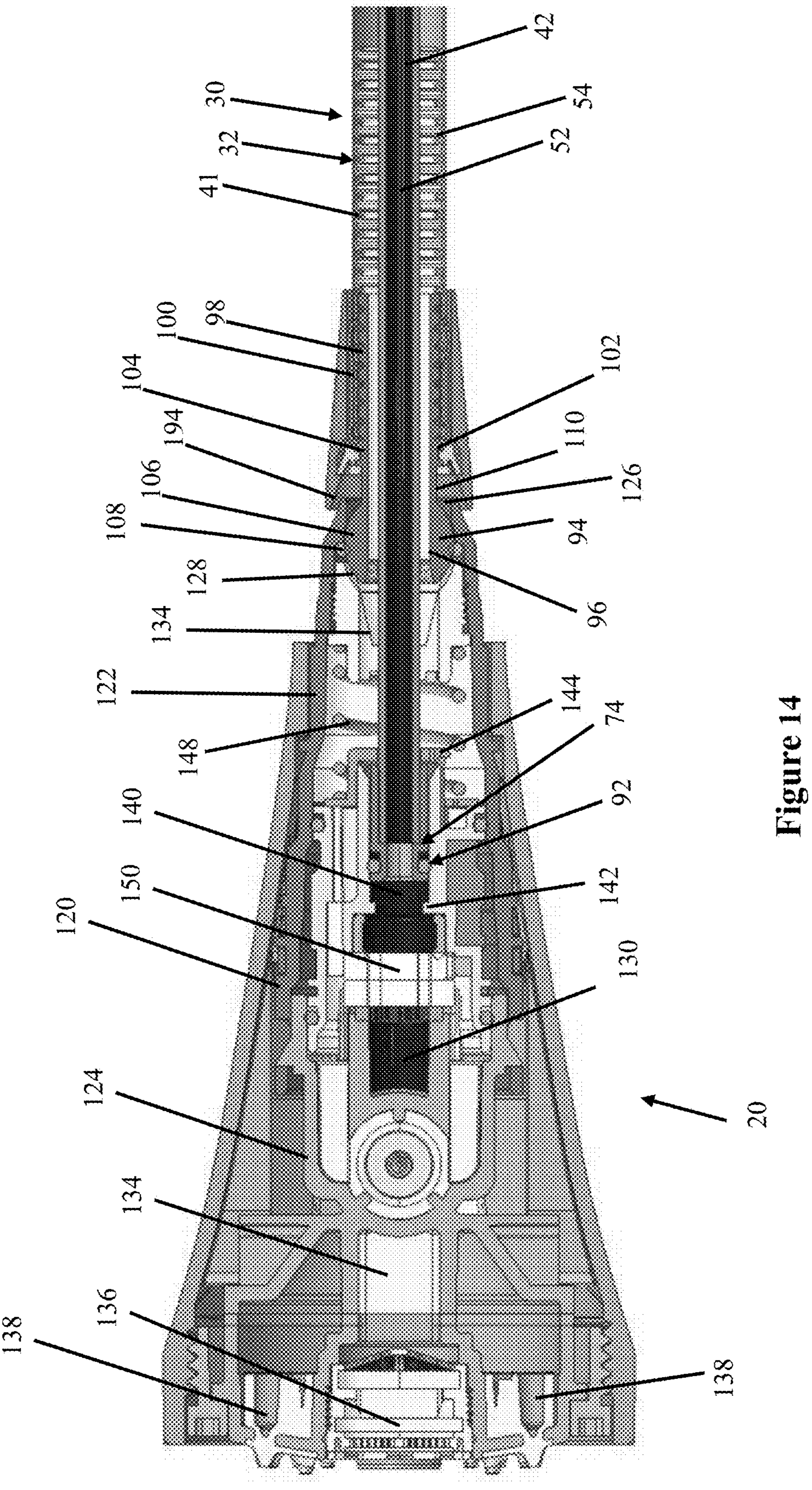
FIG. 14 is a top cross-sectional view of the wand hose of FIG. 5 coupled with the wand of FIG. 5.
Figure 15:
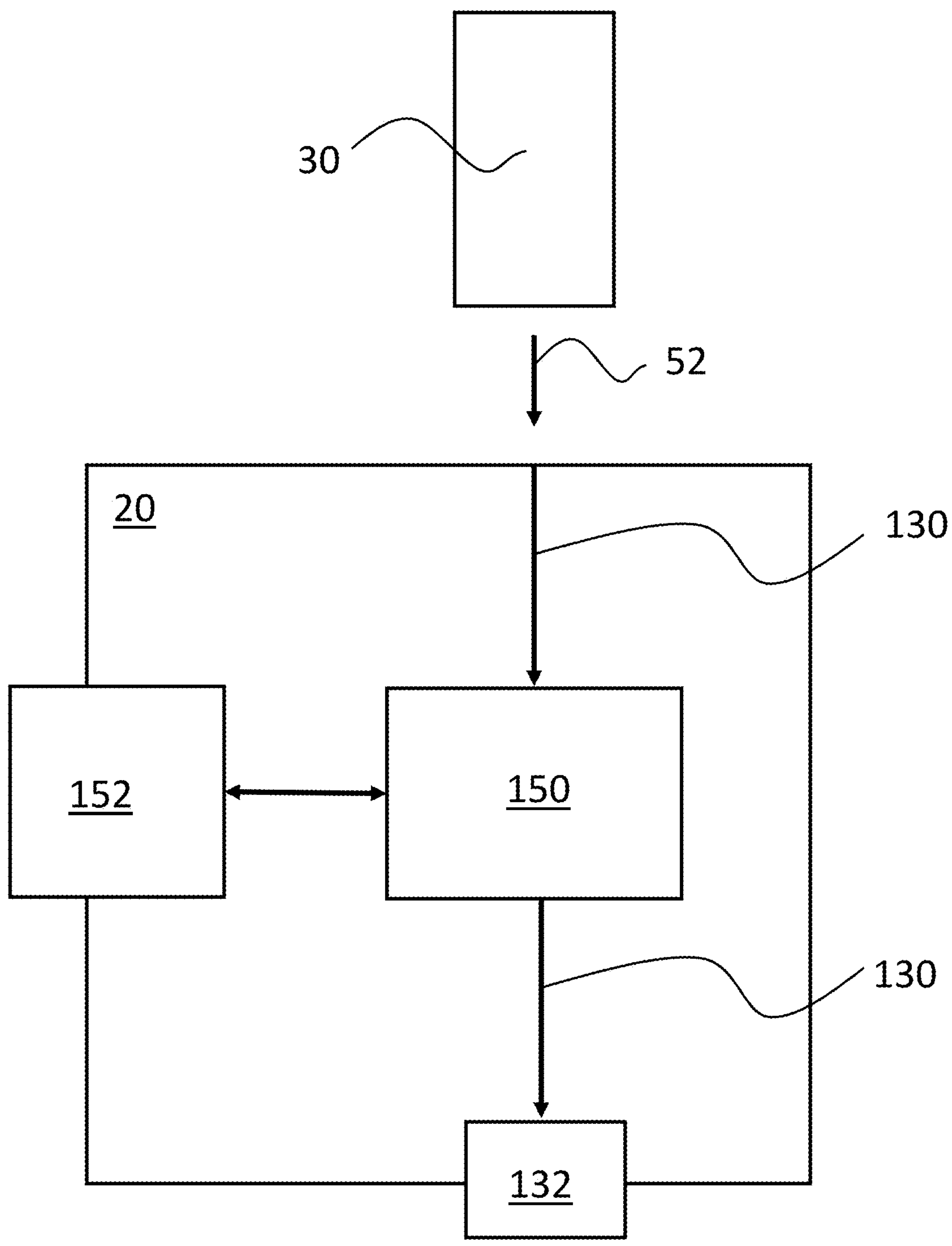
FIG. 15 is a functional block flow diagram of a wand including a shutoff mechanism.
Figure 16:
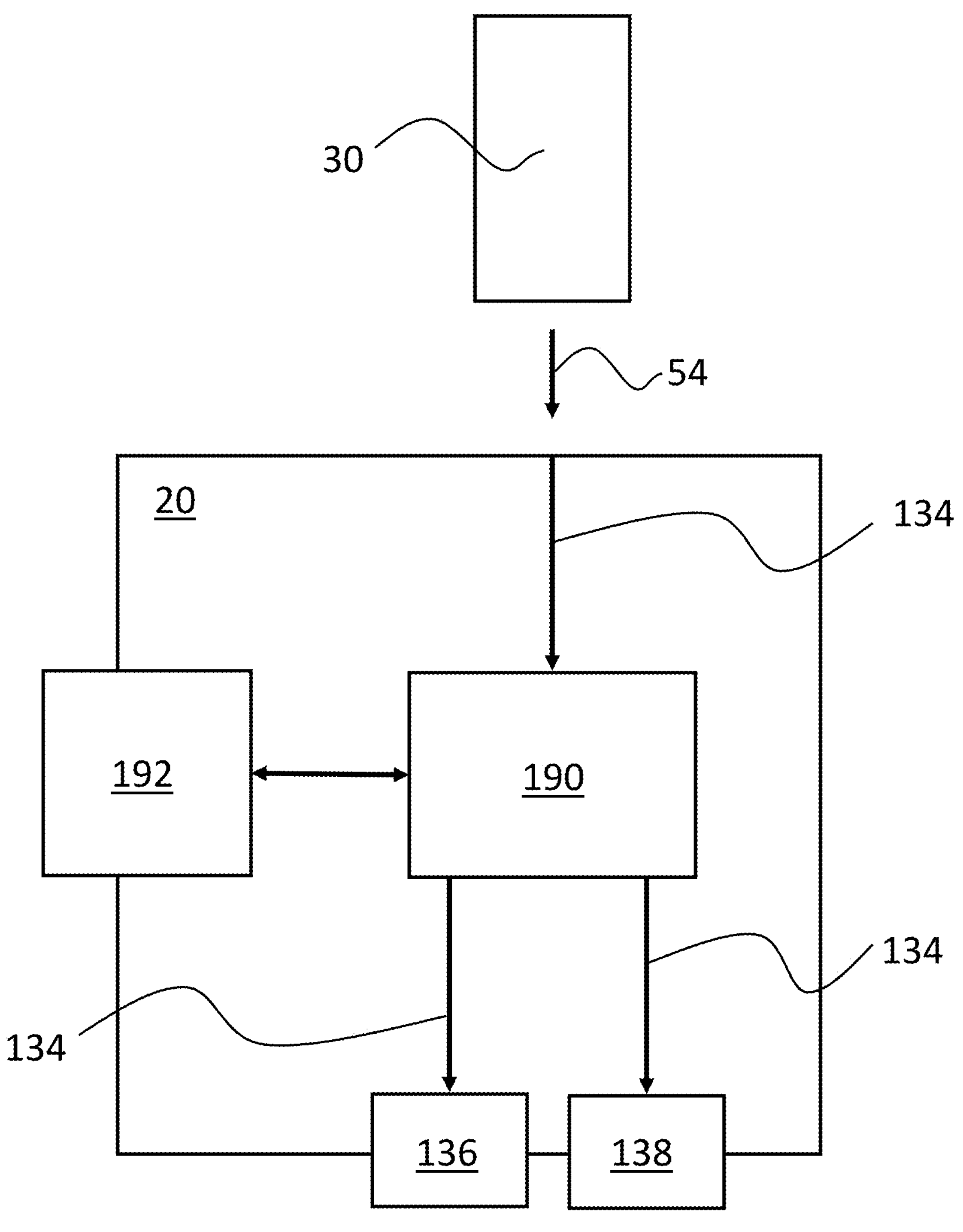
FIG. 16 is a functional block flow diagram of a wand including a diverter mechanism.
Figure 17:
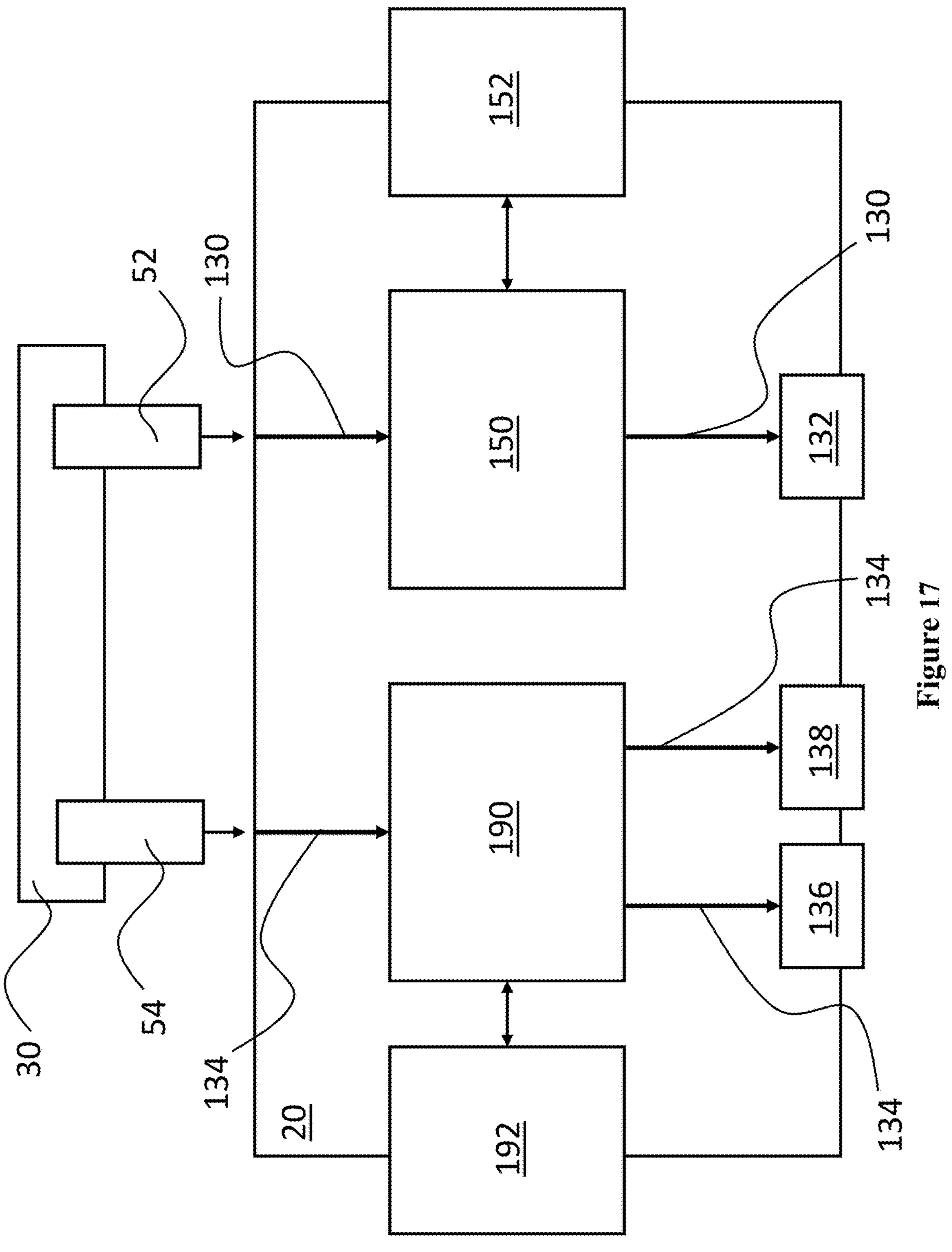
FIG. 17 is a functional block flow diagram of a wand including a shutoff mechanism and a diverter mechanism.
Figure 18:
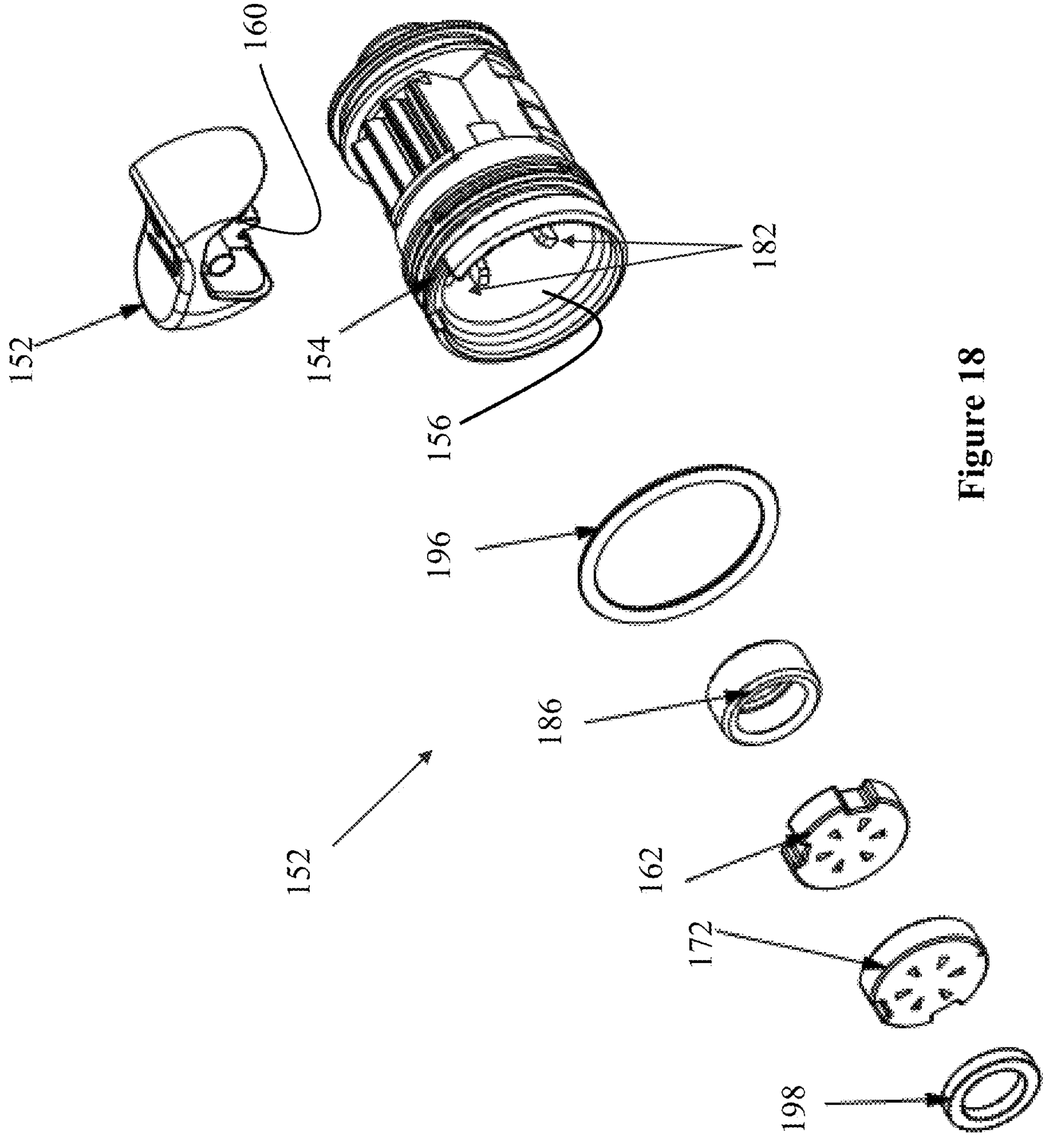
FIG. 18 is an exploded perspective view of a shutoff mechanism for a wand.
Figure 19:
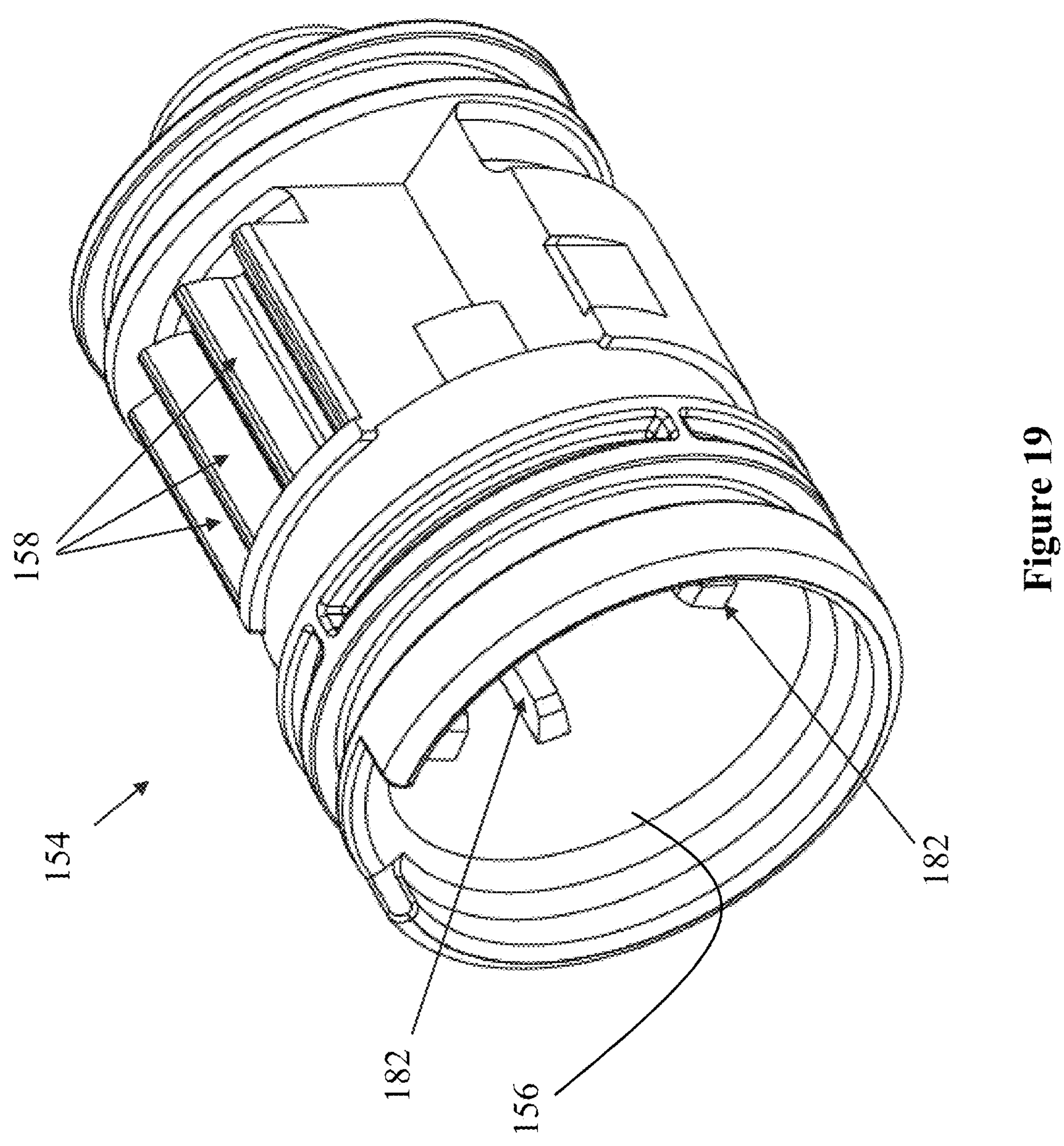
FIG. 19 is a perspective view of a body for the shutoff mechanism of FIG. 18.
Figure 20:
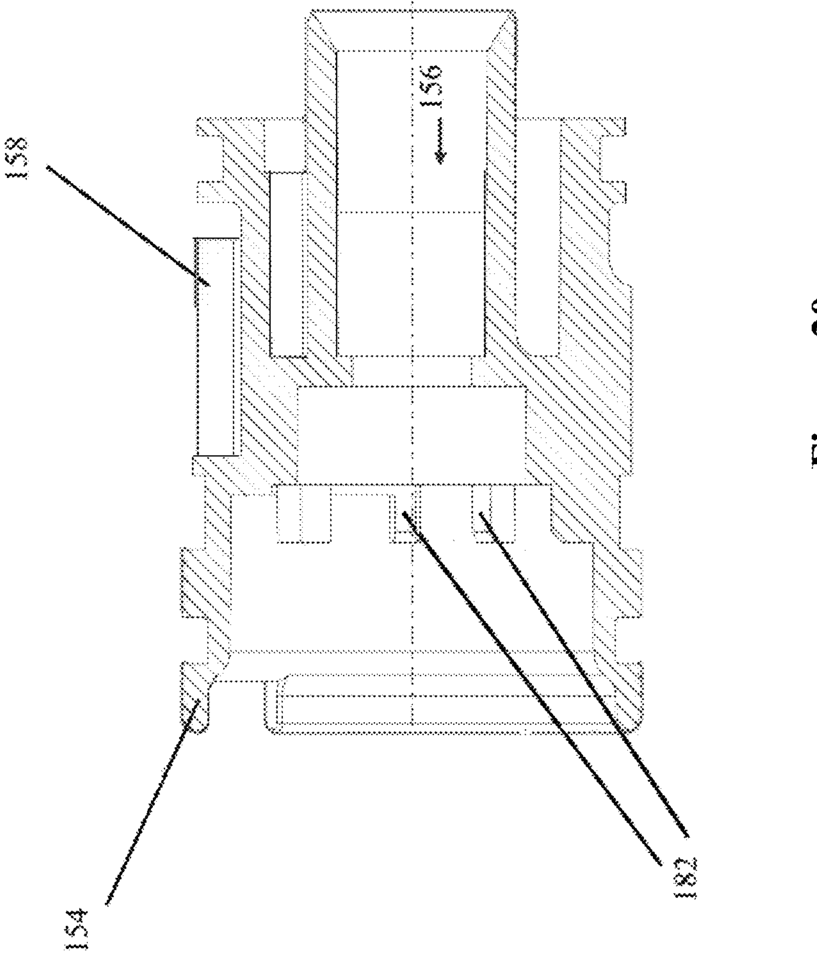
FIG. 20 is a side cross sectional view of the body of FIG. 19.
Figure 21:
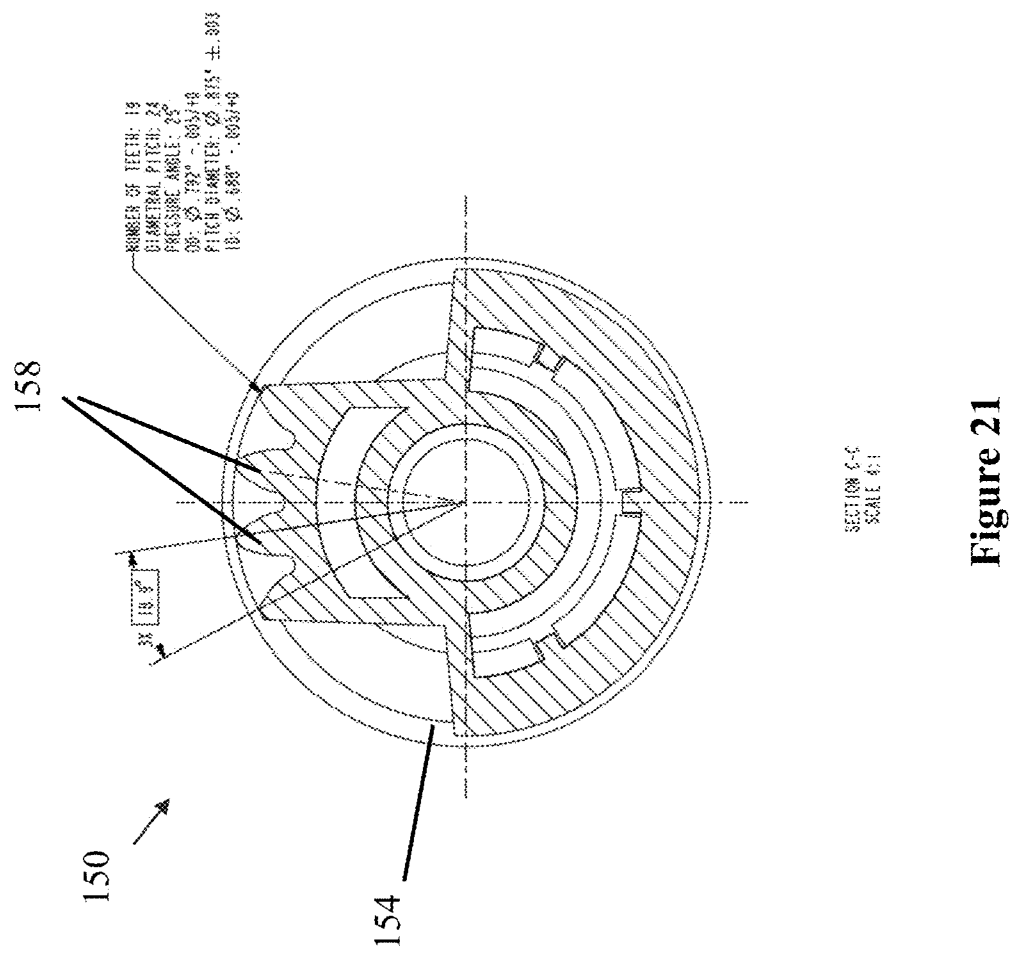
FIG. 21 is a rear cross sectional view of the body of FIG. 19.
Figure 22:
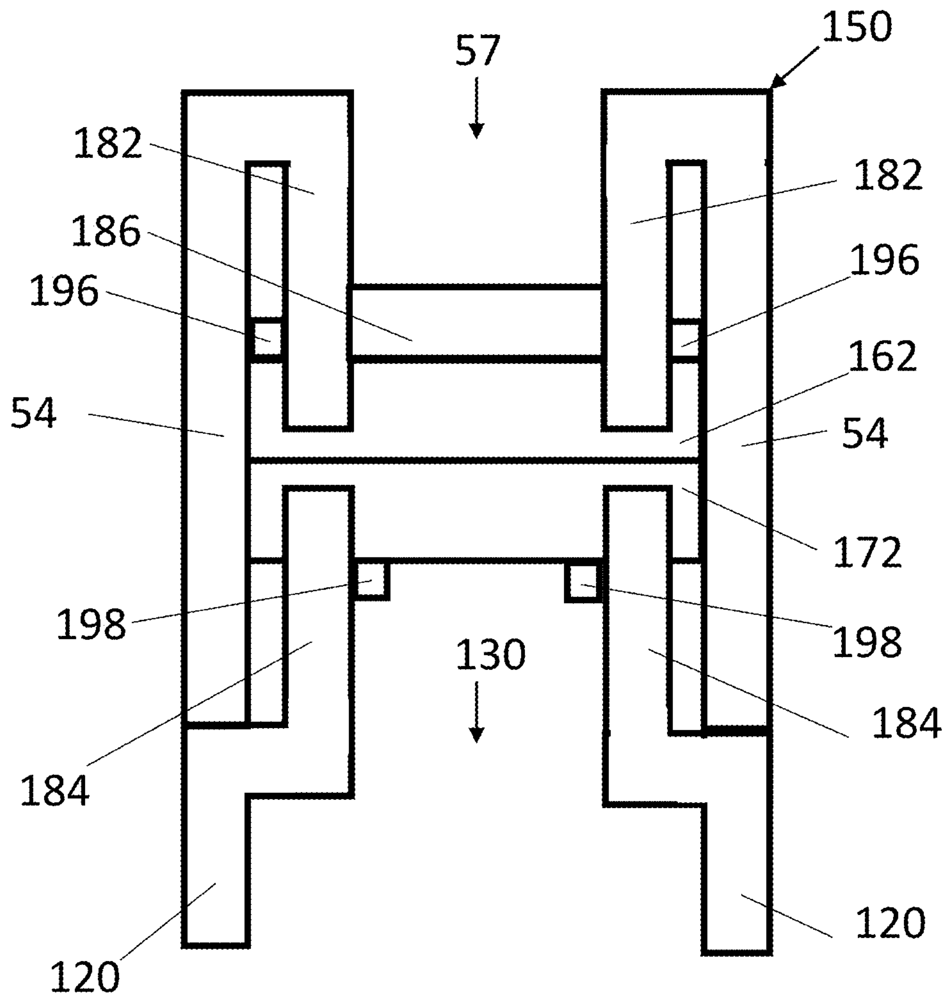
FIG. 22 is a top-down schematic cross sectional view of the shutoff mechanism of FIG. 19 in the wand of FIGS. 14 and 14.
Figure 23:
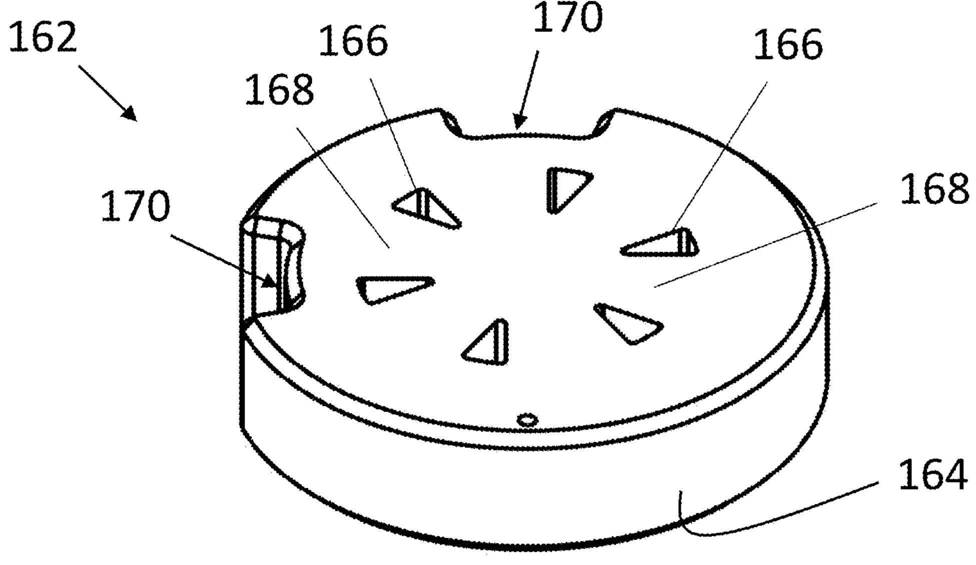
FIG. 23 is a top-side elevational view of a first gate of the shutoff mechanism of FIG. 18.
Figure 24:
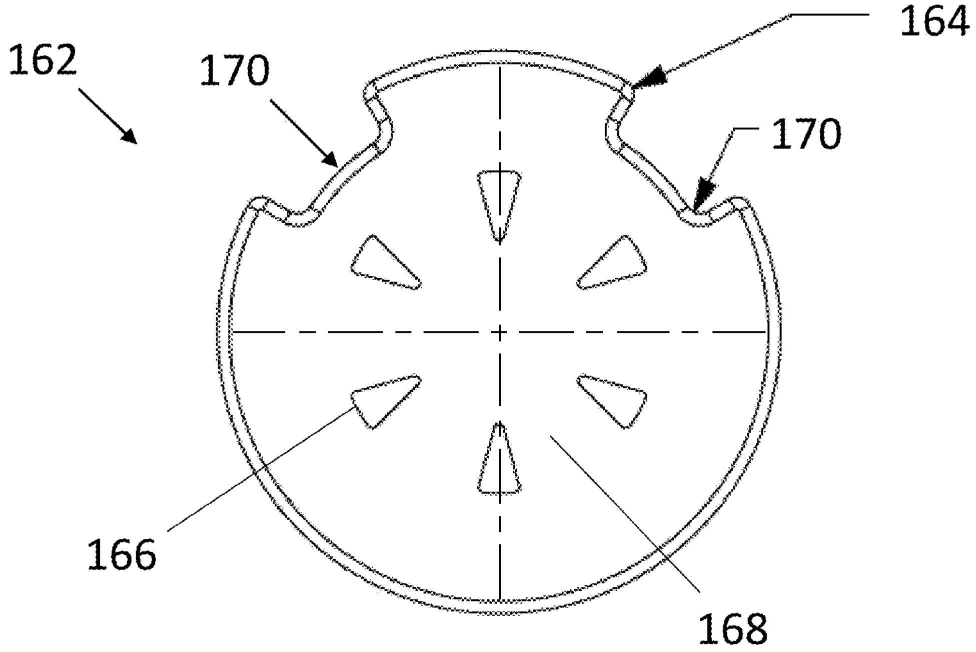
FIG. 24 is a front view of the first gate of FIG. 23.
Figure 25:
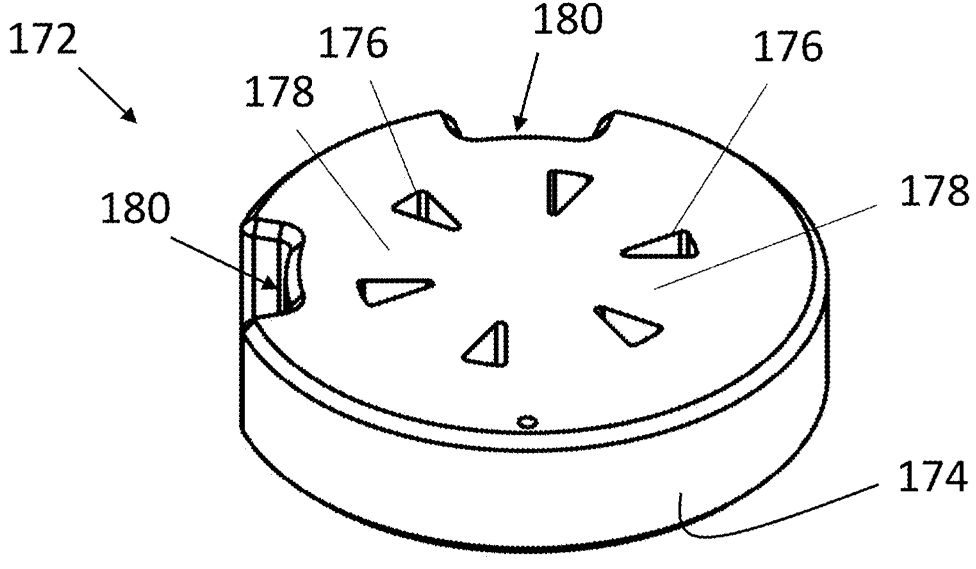
FIG. 25 is a top-side elevational view of a second gate of the shutoff mechanism of FIG. 18.
Figure 26:
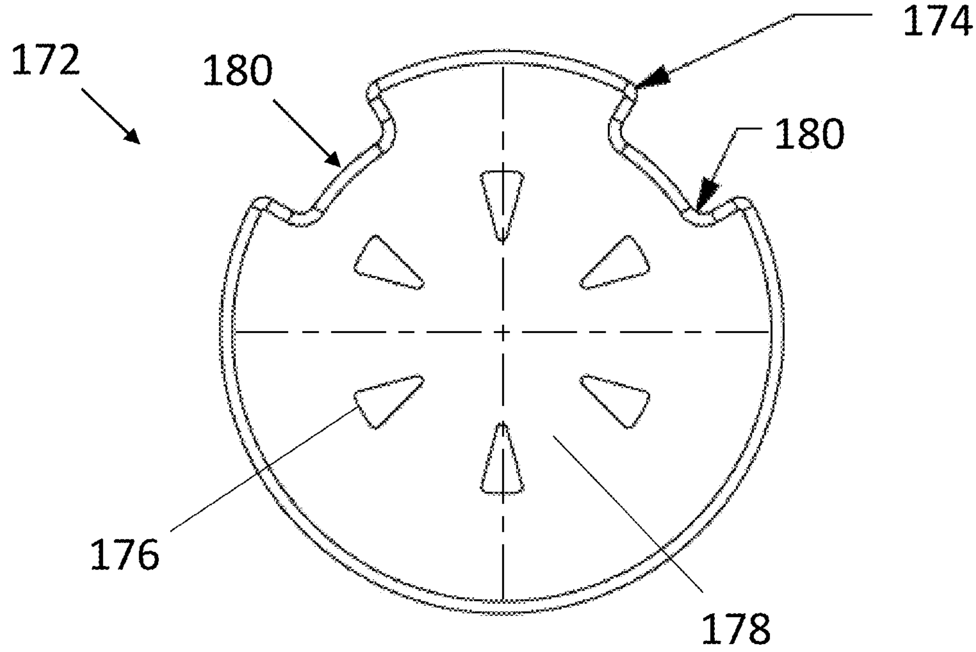
FIG. 26 is a front view of the second gate of FIG. 25.

Exemplary cross sections of the wand 20 are shown in FIGS. 13-14 and exemplary block flow diagrams of portions of the wand 20 are shown in FIGS. 15-17. The wand 20 includes a frame 120 extending from an upstream end of the wand 20 to a downstream end of the wand 20. The upstream end of the frame 120 may be configured to dock in or otherwise couple with the body of the faucet 10, such as with the receptor 18, when the wand 20 is retracted toward the body of the faucet 10. The upstream end of the frame 120 is configured to couple the wand hose 30 with the waterways extending through the frame 120 from the upstream end to the downstream end. In an exemplary embodiment, the upstream end of the frame 120 is configured to couple with the wand hose 30. The downstream end of the frame 120 may include one or more outlets configured to allow flow out of the waterways and out of the downstream end of the wand 20. The wand 20 may also include a shell which substantially surrounds the frame 120.

The frame 120 may include an upstream frame portion 122 and a downstream frame portion 124. The upstream and downstream frame portions 122, 124 may connect or otherwise couple together to form the frame 120. In some embodiments, the upstream and downstream frame portions 122, 124 snap or press fit together. In other embodiments, the upstream and downstream frame portions 122, 124 are coupled together via fasteners, adhesives, springs, etc.

The upstream frame portion 122 of the wand 20 includes an upstream opening 126 at the upstream end of the wand 20. The upstream opening 126 is configured to receive a downstream portion of the wand hose 30 or a coupler connected to the downstream end of the wand hose 30 to secure or otherwise couple the wand 20 with the wand hose 30. The upstream frame portion 122 may also include a coupler receiving portion 128 downstream of the upstream opening 126. The coupler receiving portion 128 may be sized, shaped, and configured to operatively retain a downstream portion of the wand hose 30 and/or a coupler connected to the downstream end of the wand hose 30 such that the wand 20 may be coupled with the wand hose 30 and pulled away from the receptor 18 and manipulated by a user, as described below.

The wand 20 includes a first waterway 130 for receiving a first fluid flow from the wand hose 30 and extending from an upper portion of the wand 20 to a first outlet 132 disposed at the downstream end of the wand 20. The first waterway 130 may be fluidly coupled with the first flow path 52 of the wand hose 30. The first waterway 130 may begin downstream of the coupler receiving portion 128. The frame 120 of the wand 20 may be configured such that the inner hose 42 may extend through the upstream opening 126, through the coupler receiving portion 128, and into the first waterway 130 when the wand hose 30 is coupled with the wand 20. The wand 20 may be configured to operatively control the flow of fluid in the first waterway 130 to the first outlet 132, as described below.

The wand 20 also includes a second waterway 134 for receiving a second fluid flow from the wand hose 30 and extending from the coupler receiving portion 128 to one or more outlets disposed at the downstream end of the wand 20. The second waterway 134 may be fluidly coupled with the second flow path 54 of the wand hose 30. In an exemplary embodiment, the wand 20 includes a second or aerator outlet 136 and one or more third or spray outlets 138 at the downstream end of the second waterway 134. The wand 20 may be configured to operatively control the flow of fluid in the second waterway 134 to the aerator outlet 136 and/or the spray outlets 138.

As shown in FIGS. 5, 7, and 13-14, the downstream end of the outer hose 32 may be coupled with an upstream end of the wand 20 such that the outer hose outlet 36 is in fluid communication with the second waterway 134 of the wand 20. The downstream end of the inner hose 42 may be coupled with an upstream end of the wand 20 such that the inner hose outlet 46 is in fluid communication with the first waterway 130 of the wand 20. The inner hose 42 may extend downstream through the outer hose outlet 36 of the outer hose 32, through a portion of the second waterway 134 of the wand 20, and into the first waterway 130 of the wand 20. The outer hose 32 and the inner hose 42 may each be coupled with the wand 20 such that the wand 20 may be pulled away from the body of the faucet 10, manipulated by a user, and provide water out of one of the downstream outlets of the wand 20.

As shown in FIGS. 7-10 and 13-14, in some embodiments, the downstream end of the inner hose 42 may include or be coupled with a downstream inner hose fitting or cap 74 configured to couple with the wand 20 such that the wand 20 may be pulled away from the body of the faucet 10 and the inner hose 42 may remain coupled with the wand 20. For example, the downstream inner hose fitting 74 may be sized, shaped, and configured to remain coupled with the wand 20 when the wand hose 30 is manipulated by a user, such as by being pulled away from the body of the faucet 10, bent, twisted, or the like. In some embodiments, the downstream inner hose fitting 74 is configured such that the inner hose 42 may be pressurized with a supply of fluid, such as with a continuously pressurized supply of treated water. The downstream inner hose fitting 74 may couple the inner hose 42 with the wand 20 such that the inner hose 42 may be continuously pressurized and the wand 20 may be manipulated by a user, pulled away from the receptor 18, or pulled away from the receptor 18 and manipulated by a user. In some embodiments, the downstream inner hose fitting 74 is generally cylindrical.

The downstream inner hose fitting 74 may include a coupling portion 76 configured to attach to a downstream end of the inner hose 42. The coupling portion 76 may be sized, shaped, and configured to be securely retained on and around the downstream end of the inner hose 42. An inner surface 78 of the coupling portion 76 may have a diameter substantially the same as the diameter of the outer surface 50 of the inner hose 42. An outer surface of the coupling portion 76 may have a diameter larger than the outer surface 50 of the inner hose 42. In some embodiments, the coupling portion 76 of the downstream inner hose fitting 74 is laser welded to the downstream end of the outer surface 50 of the inner hose 42. In other embodiments, the downstream inner hose fitting 74 is attached to the outer surface 50 of the inner hose 42 with fasteners, adhesives, etc.

The downstream inner hose fitting 74 may also include a cap portion 80 downstream of the coupling portion 76. The cap portion 80 may be configured to be operatively coupled with the wand 20. The cap portion 80 extends downstream from the coupling portion 76 and is configured to be retained in a portion of the first waterway 130 of the wand 20. In some embodiments, the cap portion 80 and the wand 20 are configured such that the cap portion 80 of the downstream inner hose fitting 74 may slide or otherwise move upstream and downstream within the first waterway 130 of the wand 20. The cap portion 80 and the wand 20 may also be configured such that the downstream inner hose fitting 74 and the downstream end of the inner hose 42 may rotate within the first waterway of 130 of the wand 20.

The cap portion 80 has a cap inner surface 82 with a diameter less than a diameter of the inner surface 78 of the coupling portion 76. In some embodiments, the cap inner surface 82 of the cap portion 80 has a diameter equivalent to the diameter of the inner surface 48 of the inner hose 42 such that the inner surface 48 of the inner hose 42 is substantially continuous with the cap inner surface 82 of the cap portion 80 when the downstream end of the inner hose 42 is disposed within the downstream inner hose fitting 74. The first flow path 52 of the wand hose 30 may extend from the inner surface 48 to the cap inner surface 82 such that the downstream end of the downstream inner hose fitting 74 defines the downstream end of the first flow path 52. A cap outer surface 84 of the cap portion 80 has a diameter substantially the same as the outer surface of the coupling portion 76.

The downstream inner hose fitting 74 may also include a shoulder 88 extending radially inwardly from the inner surface 78 of the coupling portion 76 to the cap inner surface 82 of the cap portion 80. The shoulder 88 may extend perpendicularly to the inner surface 78 of the coupling portion 76. The downstream inner hose fitting 74 may be sized, shaped, and configured such that the downstream end of the inner hose 42 may abut the shoulder 88 when the inner hose 42 is inserted into downstream inner hose fitting 74.

The cap portion 80 may have a recessed portion 90 extending radially inwardly from the outer surface of the cap portion 80. The downstream inner hose fitting 74 may include a fitting seal 92 disposed in the recessed portion 90. The fitting seal 92 may be configured to provide a fluid seal between the outer surface of the downstream inner hose fitting 74 and the first waterway 130 of the wand 20 when the downstream inner hose fitting 74 is disposed in the first waterway 130. In some embodiments, the downstream inner hose fitting 74 is laser welded to the downstream end of the outer surface 50 of the inner hose 42. In other embodiments, the downstream inner hose fitting 74 is attached to the outer surface 50 of the inner hose 42 with fasteners, adhesives, etc.

The inner surface 78 of the coupling portion 76 and the cap inner surface 82 of the cap portion 80 define a passage through the downstream inner hose fitting 74. When the downstream inner hose fitting 74 is disposed on the downstream end of the inner hose 42, the inner surface 78 of the coupling portion 76 and the cap inner surface 82 of the cap portion 80 may define or extend the downstream end of the first flow path 52 of the wand hose 30 such that fluid from the inner hose 42 flows through the inner hose outlet 46 of the inner hose 42, through the downstream inner hose fitting 74, and into the first waterway 130 of the wand 20. The downstream end of the cap inner surface 82 of the cap portion 80 may be tapered radially outwardly to facilitate flow out of the downstream inner hose fitting 74 into the first waterway of the wand 20.

The downstream end of the inner hose 42 may be connected with the downstream inner hose fitting 74 and disposed through the faucet 10 such that the downstream inner hose fitting 74 is disposed within the wand 20. The inner hose 42 and downstream inner hose fitting 74 may extend through the second waterway 134 of the wand 20 which may receive fluid from the second flow path 54 of the wand hose 30. The downstream end of the inner hose 42 and the downstream inner hose fitting 74 may extend into the first waterway 130 of the wand 20 and the downstream inner hose fitting 74 may be sized, shaped, and configured to retain the downstream inner hose fitting 74 and at least a portion of the inner hose 42 within a portion the first waterway 130 of the wand 20. For example, the downstream inner hose fitting 74 may have an outer circumference which is radially larger than portions of the first waterway of the wand 20 upstream and downstream of the downstream end of the inner hose 42 and the downstream inner hose fitting 74.

The wand 20 may include a hose retaining portion 140 along a length of the first waterway 130 configured to receive and operatively retain the downstream inner hose fitting 74. The hose retaining portion 140 may be substantially cylindrical to receive the downstream inner hose fitting 74 and receive fluid from the first flow path 52 of the wand hose 30. A diameter of an inner wall of the hose retaining portion 140 may be substantially similar to the diameter of the outer surface of the downstream inner hose fitting 74 such that the downstream inner hose fitting 74 may be received within and slide along a length (e.g., upstream and downstream) of the hose retaining portion 140. The hose retaining portion 140 may also be sized and shaped such that the downstream inner hose fitting 74 and the inner hose 42 may rotate about a longitudinal axis extending through the hose retaining portion 140.

The hose retaining portion 140 may have a neck 142 at the downstream end of the hose retaining portion 140 and extending radially inwardly from the inner wall of the hose retaining portion 140. The neck 142 may be configured to abut a downstream end of the downstream inner hose fitting 74 and prevent the downstream inner hose fitting 74 and the inner hose 42 from sliding downstream of the neck 142. The neck 142 may also define a passage or flow path such that fluid which flows from the first flow path 52 of the wand hose 30 may flow through the neck 142 and downstream through the first waterway 130 of the wand 20.

The hose retaining portion 140 may also include a base 144 at the upstream end of the hose retaining portion 140 and extending radially inwardly from the inner wall of the hose retaining portion 140. The base 144 may be configured to abut an upstream end of the downstream inner hose fitting 74 and prevent the downstream inner hose fitting 74 from sliding upstream of the base 144. The base 144 may also define or include an aperture or passage configured to be disposed around the outer surface 50 of the inner hose 42. The neck 142 and base 144 of the hose retaining portion 140 may define the upstream and downstream limits, respectively, that the downstream inner hose fitting 74 may move (e.g., slide) within the wand 20.

In some embodiments, the base 144 is separate from the remainder of the hose retaining portion 140 such that the base 144 may be disposed upstream of the downstream inner hose fitting 74 after the downstream inner hose fitting 74 has been placed in the hose retaining portion 140. For example, the base 144 may be a part of the upstream frame portion 122 of the wand 20 such that the hose retaining portion 140 is formed when the upstream and downstream frame portions 122, 124 are coupled together. In some embodiments, the base 144 is biased in the downstream direction to retain the downstream inner hose fitting 74 in the hose retaining portion 140 of the wand 20. The wand 20 may include a biasing element 148 disposed in the upstream frame portion 122 configured to bias the base 144 toward the remainder of the hose retaining portion 140. In an exemplary embodiment, the biasing element 148 is a helical spring. In other embodiments, the biasing element 148 is a leaf spring.

When disposed in the hose retaining portion 140, the downstream inner hose fitting 74 may slide axially (e.g., upstream and downstream) along a length of the hose retaining portion 140 between the neck 142 and the base 144. The downstream end of the first flow path 52 of the wand hose 30 (e.g., the downstream inner hose fitting 74 and the downstream end of the inner hose 42) may be relatively unsecured such that the downstream inner hose fitting 74 and downstream end of the inner hose 42 may move longitudinally upstream and downstream and/or rotate about a longitudinal axis extending through the hose retaining portion 140 when the downstream inner hose fitting 74 and downstream end of the inner hose 42 are disposed within the hose retaining portion 140. The downstream inner hose fitting 74 and the downstream end of the inner hose 42 may axially translate and/or rotate within the hose retaining portion 140 when the inner hose 42 is pressurized and/or when the wand 20 is manipulated by a user. For example, the downstream inner hose fitting 74 and the downstream end of the inner hose 42 may axially translate and/or rotate within the hose retaining portion 140 when the wand hose 30 is pulled away from the body of the faucet 10, bent, twisted, or the like. The movement of the downstream inner hose fitting 74 and the downstream end of the inner hose 42 relative to the wand 20 may decrease forces acting upon the ends of the wand hose 30 during operation of the faucet 10.

As shown in FIGS. 6-10 and 13-14, the upstream frame portion 122 of the wand 20 is configured to couple with the downstream end of the outer hose 32 such that the downstream end of the second flow path 54 of the wand hose 30 is disposed in an upstream portion of the second waterway 134 of the wand 20. The downstream end of the outer hose 32 may be coupled with the upstream end of the wand 20 with a hose coupler 94 configured to fluidly connect the second flow path 54 of the wand hose 30 with the second waterway 134 of the wand 20, permit the downstream end of the inner hose 42 to be disposed in the first waterway 130, and allow the wand 20 to be pulled away from the receptor 18 and/or manipulated, such as by a user, and such that fluid may flow from the second flow path 54 of the wand hose 30 to the second waterway of the wand 20. For example, an upstream end of the hose coupler 94 may be coupled with the downstream end of the outer hose 32 and a downstream end of the hose coupler 94 may be coupled with an upstream portion of the wand 20. The hose coupler 94 may direct fluid from the second flow path 54 of the wand hose 30 to the second waterway 134 of the wand 20. The hose coupler 94 may also facilitate the provision of fluid from the first flow path 52 of the wand hose 30 to the first waterway 130 of the wand 20. In an exemplary embodiment, the hose coupler 94 comprises chrome-plated brass. In other embodiments, the hose coupler 94 comprises plastic or the like.

The hose coupler 94 may include or define a coupler passage 96 extending through the hose coupler 94 from an upstream end to a downstream end. The coupler passage 96 may have a diameter larger than the outer surface 50 of the inner hose 42 such that the inner hose 42 may extend through the coupler passage 96 and such that fluid may pass between an inside surface of the coupler passage 96 and the outer surface 50 of the inner hose 42. The coupler passage 96 of the hose coupler 94 may define and/or extend the downstream end of the second flow path 54 of the wand hose 30. When the hose coupler 94 is coupled with the outer hose 32 and the upstream end of the wand 20, fluid may flow through the second flow path 54 of the wand hose 30 and into the second waterway 134 of the wand 20. The inner hose 42 may extend substantially unrestricted through the hose coupler 94 via the coupler passage 96. The inner hose 42 may axially translate substantially freely relative to the outer hose 32 and hose coupler 94 and/or may rotate substantially freely relative to the outer hose 32 and the hose coupler 94, such as described below.

The hose coupler 94 may include a hose coupling portion 98 configured to couple with a downstream end of the outer hose 32. The hose coupling portion 98 may have an outer diameter substantially the same as the inner surface 38 of the outer hose 32 such that the downstream end of the outer hose 32 may be disposed on and around the hose coupling portion 98. An outer surface of the hose coupling portion 98 may be sized, shaped, and configured to fittingly couple with the inner surface 38 of the outer hose 32. The downstream end of the outer hose 32 may include a plurality of crimps 41 and the outer surface of the hose coupling portion 98 may have a plurality of detents for matingly receiving the plurality of crimps 41. In some embodiments, the hose coupling portion 98 is laser welded to the inner surface 38 of the outer hose 32. In other embodiments, the hose coupling portion 98 is attached to the inner surface 38 of the outer hose 32 with fasteners, adhesives, etc.

In some embodiments, the hose coupling portion 98 also includes an outer coupler 100 disposed at a downstream end. The outer coupler 100 may be configured to couple with the outer surface 40 of the outer hose 32. The outer coupler 100 may extend upstream and bias the outer hose 32 radially inwardly toward the hose coupling portion 98. For example, the outer coupler 100 may form a press fit engagement with the outer surface 40 of the outer hose 32 when the outer hose 32 is disposed on the hose coupler 94.

The hose coupler 94 may also include a rib 102 disposed on an outer surface of the hose coupler 94 downstream from the hose coupling portion 98. The rib 102 may be sized, shaped, and configured to abut a downstream end of the outer hose 32. The rib 102 may extend radially outwardly from the hose coupling portion 98 to a distance which prevents the outer hose 32 from sliding downstream beyond the rib 102 (e.g., downstream from the hose coupling portion 98) when the outer hose 32 is disposed on the hose coupler 94.

The hose coupler 94 may also include a retention portion 104 downstream of the hose coupling portion 98. The retention portion 104 may be configured to couple with a shroud 194. In some embodiments, the retention portion 104 extends radially inwardly from the outer surface of the hose coupling portion 98. The retention portion 104 is sized, shaped, and configured to operatively couple with the shroud 194 which may operatively couple with a downstream end of the body of the faucet 10, such as the receptor 18. The shroud 194 may abut the downstream end of the receptor 18 when the wand 20 is retracted toward the body of the faucet 10 and the shroud 194 and hose coupler 94 may be pulled away from the receptor 18, such as by a user. The shroud 194 may prevent the wand hose 30 from retracting upstream into the receptor 18 when the wand 20 is retracted toward the body of the faucet 10. The retention portion 104 may receive a seal, such as an O-ring type seal.

The hose coupler 94 may also include a wand coupling portion 106 configured to couple with or be otherwise retained within an upstream portion of the wand 20. For example, the wand coupling portion 106 may be sized, shaped, and configured such that the wand coupling portion 106 may be fittingly retained in an upstream end of the frame 120 of the wand 20. In some embodiments, the wand coupling portion 106 is sized, shaped, and configured such that the wand coupling portion 106 may be fittingly retained in the coupler receiving portion 128 of the wand 20. The wand coupling portion 106 may be sized, shaped, and configured such that the wand 20 may be retracted from the receptor 18 and such that the wand coupling portion 106 does not retract upstream from the frame of the wand 20. For example, the wand coupling portion 106 may be disposed in the coupler receiving portion 128 of the wand 20 and the upstream opening 126 may be smaller than the wand coupling portion 106 such that the wand coupling portion 106 is not retractable upstream through the upstream opening 126. The wand coupling portion 106 may be sized, shaped, and configured such that the wand coupling portion 106 may swivel within a portion of the wand 20. For example, the wand coupling portion 106 may be substantially spherical or ball-shaped such that the wand coupling portion 106 may swivel within the coupler receiving portion 128 of the wand 20. It will be understood that the swivel of the wand coupling portion 106 encompasses rotational movement about a longitudinal axis extending through the wand coupling portion 106, pivoting movement about a center point of the wand coupling portion 106, twisting motion, and the like, and combinations thereof.

In some embodiments, the wand coupling portion 106 includes a seal 108 disposed between an outer surface of the wand coupling portion 106 and a portion of the wand 20, such as a wall of the coupler receiving portion 128. The seal 108 may be configured to prevent fluid flowing through the coupler passage 96 of the hose coupler 94 from flowing upstream of the wand coupling portion 106 within the wand 20. For example, the seal 108 may be an O-ring type seal.

In some embodiments, the hose coupler 94 also includes a neck portion 110 disposed between the hose coupling portion 98 and the wand coupling portion 106. The neck portion 110 may have an outer surface with a diameter less than the outer surfaces of the hose coupling portion 98 and the wand coupling portion 106. The neck portion 110 may be sized, shaped, and configured such that the wand 20 may be pulled away from the receptor and 18 and/or manipulated by a user when the wand hose 30 extends through the body of the faucet 10 and is coupled with the wand 20. For example, the neck portion 110 may be sized to fit through the upstream opening 126 into the wand 20 which the wand coupling portion 106 is not retractable from. The neck portion 110 may also be sized, shaped, and configured such that the wand 20 may swivel about the hose coupler 94 and/or the downstream end of the outer hose 32 when the hose coupler 94 couples the outer hose 32 and the wand hose 30. For example, the neck portion 110 may be smaller than the upstream opening 126 and extend through the upstream opening 126 with the wand coupling portion 106 disposed within the wand 20 and the remainder of the hose coupler 94 disposed upstream of the neck portion 110 such that the wand coupling portion 106 may swivel and the neck portion 110 may move correspondingly within the upstream opening 126 of the wand 20 when the wand hose 30 is coupled with the wand 20.

The coupler receiving portion 128 of the frame 120 is configured to receive the wand coupling portion 106 of the hose coupler 94. The coupler receiving portion 128 and the wand coupling portion 106 are sized, shaped, and configured such that the wand coupling portion 106 may swivel within the coupler receiving portion 128. The upstream opening 126 of the frame 120 is sized, shaped, and configured to allow the neck portion 110 of the hose coupler 94 to pass therethrough and to retain the wand coupling portion 106 downstream of the upstream opening 126 and within the coupler receiving portion 128. In some embodiments, the upstream opening 126 is circular and has a diameter larger than an outer surface of the neck portion 110 such that the wand coupling portion 106 may swivel and the neck portion 110 may move correspondingly within the upstream opening 126. The diameter of the upstream opening 126 may also be smaller than outer surface of the wand coupling portion 106 of the hose coupler 94 such that the wand coupling portion 106 remains in the coupler receiving portion 128 and does not move upstream of the upstream opening 126.

In some embodiments, the wand coupling portion 106 includes a seal 108 disposed between an outer surface of the wand coupling portion 106 and a portion of the wand 20. The seal 108 may be configured to prevent fluid flowing through the coupler passage 96 of the hose coupler 94 from flowing upstream of the wand coupling portion 106. For example, the seal 108 may be an O-ring type seal.

The wand coupling portion 106 and neck portion 110 may be sized, shaped, and configured such that the wand 20 may be pulled away from the body of the faucet 10, such as from the receptor 18, and swiveled about the hose coupler 94 and manipulated by a user. The wand coupling portion 106 may swivel within the coupler receiving portion 128 and the neck portion 110 may be movable within the upstream opening 126 of the wand 20 such that the wand 20 may be moved relative to the hose coupler 94. In an exemplary embodiment, the wand coupling portion 106 is substantially spherical or ball-shaped with a rounded upstream portion, a bulbous middle portion, and a rounded downstream portion. The upstream opening 126 and the coupler receiving portion 128 of the wand 20 and the wand coupling portion 106 and the neck portion 110 of the hose coupler 94 may operate as a ball and socket joint between the wand 20 and the wand hose 30. In other embodiments, the wand coupling portion 106 is conical, cylindrical, triangular, etc.

When the hose coupler 94 couples the wand hose 30 with the wand 20, one or more fluids may flow from the wand hose 30 toward the outlets of the wand 20. The downstream end of the outer hose 32 is coupled with the hose coupler 94 such that the fluids from the first and second flow paths 52, 54 of the wand hose 30 are directed through the coupler passage 96 of the hose coupler 94. The fluids from the first and second flow paths 52, 54 may be directed simultaneously and separately toward the wand 20. The inner hose 42 extends through the coupler passage 96 such that the inner hose outlet 46 is downstream of the coupler receiving portion 128 of the wand 20. The inner hose 42 may axially translate and/or rotate relative to the outer hose 32 and the hose coupler 94. The wand coupling portion 106 is disposed in coupler receiving portion 128 such that fluid in the second flow path 54 of the wand hose 30 flows through the coupler passage 96, into the coupler receiving portion 128, and into the second waterway 134 of the wand 20. In some embodiments, the wand hose 30 supplies mixed water to the second waterway 134 of the wand 20.

The inner hose 42 may extend through the upstream opening 126, through the coupler receiving portion 128, through a portion of the frame 120, and into the hose retaining portion 140. The wand 20 may be configured such that the fluid in the second waterway 134 does not enter the first waterway 130. The downstream end of the inner hose 42 may be disposed in the hose retaining portion 140 such that fluid in the first flow path 52 of the wand hose 30 flows out of the inner hose 42, into the hose retaining portion 140, and into the first waterway 130 of the wand 20. In some embodiments, the downstream end of the inner hose 42 is coupled with the downstream inner hose fitting 74 in the hose retaining portion 140. In some embodiments, the inner hose 42 provides treated water to the first waterway 130 of the wand 20. In still further embodiments, the inner hose 42 provides a continuously pressurized supply of treated water to the first waterway 130 of the wand 20. While the inner hose 42 has been described as directing treated water, it will be understood that the inner hose 42 may direct other fluids to the wand 20. For example, the inner hose 42 may be coupled with a fluid supply to provide hot and cold water to the wand 20.

In some embodiments, the wand hose 30 is configured such that the outer hose 32 and the inner hose 42 may move independently from each other. The outer hose 32 and inner hose 42 are not shear constrained and can translate axially relative to each other. As the wand 20 is pulled away from the receptor 18 and the wand 20 is manipulated by a user, the inner hose 42 and the outer hose 32 may move independently, such as laterally and/or rotationally. For example, the inner hose 42 may translate back and forth relative to the outer hose 32 and/or may rotate freely from the outer hose 32, such as when the wand hose 30 is bent or otherwise manipulated by a user. The separate relative movements of the outer hose 32 and inner hose 42 may maintain full flexibility of the wand hose 30 during operation of the faucet 10 and/or may reduce forces acting upon the ends of the wand hose 30 during operation of the faucet 10.

In use, the wand hose 30 extends into the wand 20 to provide flows of fluid to the first and second waterways 130, 134 of the wand 20. The flow of fluid from the wand hose 30 to the first waterway 130 may be continuously pressurized. In some embodiments, the wand hose 30 is coupled with the filter system 300 to provide continuously pressurized filtered water to the first waterway 130 of the wand 20.

Referring now to FIGS. 15-26, in some embodiments, the wand 20 includes a shutoff mechanism 150 disposed in the first waterway 130 downstream of the downstream inner hose fitting 74 and the inner hose 42 and upstream of the first outlet 132 of the wand 20. The shutoff mechanism 150 may be configured to control the flow of fluid through the first waterway 130 to the first outlet 132. The shutoff mechanism 150 may be translationally secured in the frame 120 of the wand 20.

The shutoff mechanism 150 may be controllable to control the amount and/or volume of fluid flow to the first outlet 132. The shutoff mechanism 150 may be controllable by rotational movement, pivoting motion, electrical control, and the like. The shutoff mechanism 150 may be configured to be controllable (e.g., adjustable) between a first or closed position and a second or open position. In the closed position, the shutoff mechanism 150 prevents the fluid in the first waterway 130 from flowing downstream of the shutoff mechanism 150 to the first outlet 132. In the open position, the shutoff mechanism 150 allows the fluid in the first waterway 130 to flow downstream of the shutoff mechanism 150 and to the first outlet 132. In some embodiments, the shutoff mechanism 150 also includes a third or partially open position in which the shutoff mechanism 150 restricts the flow of fluid through the first waterway 130 from the wand hose 30 to the first outlet 132.

The shutoff mechanism 150 may be sized, shaped, or configured to control the control the flow of fluid to the first outlet 132 when the first waterway 130 receives a flow of fluid that is continuously pressurized. The wand hose 30 may be continuously pressurized such that continuously pressurized fluid, such as treated fluid, is delivered to the first waterway 130 of the wand 20. The shutoff mechanism 150 may substantially block the flow of continuously pressurized fluid through the first waterway 130 when the shutoff mechanism 150 is in the closed position. The shutoff mechanism 150 may permit the flow of continuously pressurized fluid through the first waterway 130 and out of the first outlet 132 when the shutoff mechanism 150 is in the open position. In some embodiments, the wand hose 30 is coupled with the filter 302 to provide continuously pressurized treated water to the first waterway 130 of wand 20. For example, an upstream end of the wand hose 30 may be coupled with the filter 302 and the downstream end of the wand hose 30 may be coupled with the first waterway 130 to provide a supply of continuously pressurized water to the first waterway 130 of the wand 20.

The wand 20 may also include a shutoff actuator 152 configured to control the operation of the shutoff mechanism 150. The shutoff actuator 152 may be coupled with the shutoff mechanism 150 such that adjustment of the shutoff actuator 152, such as by a user, controls the position of the shutoff mechanism 150 and the flow of fluid from the inner hose 42 through the first outlet 132 of the wand 20, such as by controlling the rotation and/or position of the shutoff mechanism 150.

In some embodiments, the shutoff actuator 152 is disposed on a side or top of the wand 20 such that a user may control the shutoff mechanism 150 when the wand 20 is pulled away from the receptor 18. In an exemplary embodiment, the shutoff actuator 152 is a switch, such as a button or toggle, which is mechanically coupled with the shutoff mechanism 150, which is operable by a thumb of a user, and which may be operable to move the shutoff mechanism 150 between the closed, partially open, and open positions. In other embodiments, the shutoff actuator 152 is a click wheel or the like which is mechanically coupled with the shutoff mechanism 150 to control the flow of fluid through the first waterway 130. In further embodiments, the shutoff actuator 152 is a button or touch screen which is electronically coupled with the shutoff mechanism 150 to control the flow of fluid through the first waterway 130.

The wand 20 may also include one or more check valves 188 disposed in the first waterway 130 upstream of the first outlet 132. The check valves 188 may be configured to prevent fluid from flowing into the first outlet 132 and into the first waterway 130. In an exemplary embodiment, the wand 20 includes two check valves 188 disposed in series upstream of the first outlet 132.

In some embodiments, as shown in FIG. 16, the wand 20 includes a diverter mechanism 190 in the second waterway 134 configured to divert fluid to the aerator outlet 136 and/or the one or more spray outlets 138. The diverter mechanism 190 may be configured to be adjustable between a first position which directs the fluid of the second waterway 134 to the aerator outlet 136, a second position which directs the fluid to the aerator outlet 136 and one or more spray outlets 138, and a third position which directs the fluid to the one or more spray outlets 138. The diverter mechanism 190 may be coupled with a diverter actuator 192 which a user may adjust to control the position of the diverter mechanism 190 and the corresponding outlet(s) 136, 138 of the second waterway 134.

In some embodiments, the diverter actuator 192 is disposed in the top or side of the wand 20 such that a user may control the flow of fluid through the second waterway 134 while the wand 20 is pulled away from the receptor 18. The diverter actuator 192 may be a slider, a toggle button, a click wheel, or the like which is mechanically coupled with the diverter mechanism 190, such as to a valve in the diverter mechanism 190, to control the flow of fluid through the second waterway 134. In other embodiments, the diverter actuator 192 is electronically coupled with the diverter mechanism 190 to control the flow of fluid through the second waterway 134.

While the wand 20 is illustrated in FIGS. 15-16 as including either a shutoff mechanism 150 or a divert mechanism 190, it will be understood that the wand 20 may include a shutoff mechanism 150 and a diverter mechanism 190. For example, as shown in FIG. 17, the wand 20 includes a shutoff mechanism 150 disposed in the first waterway 130 and a diverter mechanism 190 disposed in the second waterway 134 with a shutoff actuator 152 and a diverter mechanism 190 both accessible on an outside of the wand 20. Further, while the wand 20 is described as including one shutoff mechanism 150 and one diverter mechanism 190, it will be understood that the wand 20 may include any suitable number of shutoff mechanisms 150 and/or diverter mechanism 190.

An exemplary shutoff mechanism 150 is shown in FIGS. 18-26. The shutoff mechanism 150 is configured to control the flow of water through the wand 20. For example, the shutoff mechanism 150 may be configured to be moved between a first or closed position configured to prevent the flow of water, such as continuously pressurized water, through the wand 20 and a second or open position configured to allow the flow of water through the wand 20.

The shutoff mechanism 150 includes a body 154 coupled with the shutoff actuator 152. The body 154 may be substantially cylindrical and define a shutoff flow path 156 extending from an upstream end of the body 154 to a downstream end of the body 154. The body 154 may be retained in the frame 120 of the wand 20 such that the shutoff flow path 156 of the shutoff mechanism 150 defines a part of the first waterway 130 through the wand 20. The body 154 may include one or more engagement portions 158 configured to engage with the shutoff actuator 152 such that the shutoff actuator 152 may rotate or otherwise control the shutoff mechanism 150. In an exemplary embodiment, the shutoff mechanism 150 includes a plurality of rib-shaped engagement portions 158 disposed on an outside surface of the body 154 which are configured to couple with teeth 160 on an underside of the shutoff actuator 152. The shutoff actuator 152 may be moved or otherwise operated, such as by a user, between a first position and a second position to move the shutoff mechanism 150 between the closed position and the second position. The engagement portions 158 of the body 154 may be coupled with the teeth 160 of the shutoff actuator 152 such that the movement of the shutoff actuator 152 translates to rotational movement of the body 154 of the shutoff mechanism 150. In other embodiments, the shutoff actuator 152 may be integral with the body 154 of the shutoff mechanism 150 such that the body 154 of the shutoff mechanism 150 may be manipulated by a user via the shutoff actuator 152.

The shutoff mechanism 150 may include a first gate 162 and a second gate 172 configured to move relative to one another to control the flow of fluid through the shutoff flow path 156 of the shutoff mechanism 150. The first gate 162 may be disposed in an upstream portion of the shutoff flow path 156. The second gate 172 may be disposed in the shutoff flow path 156 downstream of the first gate 162. The first and second gates 162, 172 may be disposed in the shutoff flow path 156 such that a downstream side of the first gate 162 abuts an upstream side of the second gate 172. The first gate 162 has a first circumference 164 and the second gate 172 has a second circumference 174. The first circumference 164 may be substantially the same diameter as the portion of shutoff flow path 156 in which the first gate 162 is disposed. The second circumference 174 may be substantially the same diameter as the portion of the shutoff flow path 156 in which the second gate 172 is disposed. In an exemplary embodiment, the first and second circumferences 164, 174 are the same size, shape, and configuration. In other embodiments, the second circumference 174 is larger than the first circumference 164. In some embodiments, the first and second gates 162, 172 are circular with a diameter between about 0.400 inches and between about 0.750 inches, such as between about 0.555 inches and about 0.563 inches.

In an exemplary embodiment, the first and second gates 162, 172 comprise ceramic. In other embodiments, the first and second gates 162, 172 may comprise polyurethane, rubber, plastic, metal, or the like. In the illustrated embodiment, the first and second gates 162, 172 are substantially disk-shaped. However, it will be understood that the gates 162, 172 may have other shapes and configurations. For example, the gates 162, 172 may be oval, elliptical, etc. The first and second gates 162, 172 may have a thickness between about 0.100 inches and about 0.200 inches, such as between about 0.134 inches and about 0.137 inches, such as about 0.135 inches.

The first gate 162 may include one or more apertures or windows 166 extending through the body of the first gate 162. The second gate 172 may also include one or more apertures or windows 176 extending through the body of the second gate 172. The windows 166 of the first gate 162 may be radially disposed in the first gate 162 between a center of the first gate 162 and the first circumference 164. The windows 176 of the second gate 172 may be radially disposed in the second gate 172 between a center of the gate 172 and the second circumference 174. The windows 166 of the first gate 162 may be spaced a distance from the center of the first gate 162 corresponding to the distance between the windows 176 of second gate 172 and the center of the second gate 172 such that the windows 166, 176 may align, as described below.

In some embodiments, the windows 166, 176 are evenly spaced around the first and second gates 162, 172, respectively. In the illustrated embodiment, the windows 166, 176 are substantially triangular and extend radially inwardly. In other embodiments, the windows 166, 176 are circular, oval, rectangular, or the like. In the illustrated embodiment, the first and second gates 162, 172 each include six windows 166, 176 which are substantially triangular extending about 30° radially outwardly and spaced in a circle about 60° apart. However, it will be understood that the windows 166, 176 may be sized, shaped, configured, or positioned in other manners.

The first gate 162 may include shutter portions 168 between the windows 166 and the second gate 172 may include shutter portions 178 between the windows 176. The shutter portions 168, 178 are configured to prevent the flow of fluid therethrough.

The first gate 162 may include one or more coupling portions 170 configured to couple with a portion of the shutoff mechanism 150. The coupling portions 170 may each define an opening or receiving area configured to engagingly receive a rotating projection or key 182 of the body 154. The rotating keys 182 may be disposed in the shutoff flow path 156 and extend downstream. The rotating keys 182 may be connected or otherwise coupled with the body 154 of the shutoff mechanism 150 such that the rotating keys 182 rotate with the body 154 of the shutoff mechanism 150. A downstream end of each rotating key 182 may be configured to be received within one of the coupling portions 170 of the first gate 162. The rotating keys 182 may have a width substantially equal to a width of the coupling portion 170 such that a downstream end of the rotating key 182 substantially fills the coupling portion 170. In an exemplary embodiment, the coupling portions 170 are recessed radially inwardly from the first circumference 164. In other embodiments, the coupling portions 170 are apertures, bores, slots, etc. which extend from the upstream end of the first gate 162 toward the downstream end of the second gate 172. In the illustrated embodiment, the coupling portions 170 extend between about 20° and about 40°, such as about 30° around the first circumference 164.

The first gate 162 and the body 154 are configured such that the first gate 162 may rotate with the body 154 of the shutoff mechanism 150 when the rotating keys 182 are received in the coupling portions 170 of the first gate 162. For example, rotation of the body 154 may rotate the rotating keys 182, thereby rotating the first gate 162. In an exemplary embodiment, the first gate 162 includes two coupling portions 170 and the shutoff mechanism 150 includes two rotating keys 182. In other embodiments, the first gate 162 includes one coupling portion 170 or three or more coupling portions 170 and the body 154 includes a corresponding number of rotating keys 182.

The second gate 172 may include one or more coupling portions 180 configured to couple with a portion of the wand 20, such as the frame 120 of the wand 20. The coupling portions 180 may define an opening or receiving area configured to engagingly receive a retaining projection or key 184 of the wand 20. The retaining keys 184 may be disposed in the first waterway 130 downstream from the second gate 172 and extend upstream. An upstream end of the retaining keys 184 may be connected or otherwise coupled with the frame 120 of the wand 20. In an exemplary embodiment, the retaining keys 184 are stationary relative to the frame 120 of the wand 20. The downstream end of each retaining key 184 may be configured to be received within one of the coupling portions 180 of the second gate 172. The retaining keys 184 may have a width substantially equal to a width of the coupling portions 180 such that the upstream end of the retaining key 184 substantially fills the coupling portion 180. In an exemplary embodiment, the coupling portions 180 are recessed radially inwardly from the second circumference 174. In other embodiments, the coupling portions 180 are apertures, bores, slots, etc. which extend from the downstream end of the second gate 172 toward the upstream end of the second gate 172. In the illustrated embodiment, the coupling portions 180 extend 30° around the second circumference 174.

In an exemplary embodiment, the second gate 172 and the frame 120 of the wand 20 are configured such that the second gate 172 remains stationary relative to the frame 120 of the wand 20 when the retaining keys 184 are received in the coupling portions 180 of the second gate 172. In other embodiments, the second gate 127 and the frame 120 of the wand 20 are configured such that the retaining keys 184 and second gate 172 may be rotated, such as by a user, when the retaining keys 184 are received in the coupling portions 180 of the second gate 172. In the illustrated embodiment, the second gate 172 includes two coupling portions 180 and the frame 120 of the wand 20 includes two retaining keys 184. In other embodiments, the second gate 172 includes one coupling portion 180 or three or more coupling portions 180 and the frame 120 of the wand 20 includes a corresponding number of retaining keys 184.

The first and second gates 162, 172 are configured such that the first gate 162 may be rotated or manipulated independently from the second gate 172. Actuation of the shutoff actuator 152 may cause the body 154 and the rotating keys 182 to rotate. The coupling or engagement of the rotating keys 182 with the coupling portions 170 of the first gate 162 may cause the first gate 162 to rotate with the body 154. The coupling or engagement of the retaining keys 184 with the coupling portions 180 of the second gate 172 may maintain the second gate 172 in position in the frame 120 such that the first gate 162 rotates relative to the second gate 172.

The actuation of the shutoff actuator 152 may control the positions of the windows 166 and shutter portions 168 of the first gate 162 relative to the positions of the windows 176 and shutter portions 178 of the second gate 172. The shutoff mechanism 150 may be configured such that, when the shutoff actuator 152 is in the first or off position and the shutoff mechanism 150 is in the closed position, the windows 166 of the first gate 162 are radially offset from the windows 176 of the second gate 172. The windows 166 of the first gate 162 are aligned with the shutter portions 178 of the second gate 172 and the windows 176 of the second gate 172 are aligned with the shutter portions 168 of the first gate 162. The misalignment of the first and second gates 162, 172 closes or otherwise prevents the flow of fluid through the shutoff flow path 156 extending through the shutoff mechanism 150. In such embodiment, misalignment of the first and second gates 162, 172 prevents water upstream of the first gate 162 from flowing downstream of the second gate 172.

The shutoff actuator 152 may be moved to the second position thereby rotating the body 154 and the rotating keys 182 such that the shutoff mechanism 150 is in the open position. The rotation of the rotating keys 182 may rotate the first gate 162 such that the windows 166 of the first gate 162 are aligned with the windows 176 of the second gate 172. The alignment of the first and second gates 162, 172 opens a passage through the shutoff flow path 156 having an area equivalent to the areas of the windows 166, 176 of the first and second gates 162, 172. In such embodiment, the alignment of the first and second gates 162, 172 allows fluid upstream of the first gate 162 to flow downstream of the second gate 172.

In some embodiments, the shutoff actuator 152 may be moved to a third position such that the shutoff mechanism is in the partially open position and such that the windows 166 of the first gate 162 are partially aligned with the windows 176 of the second gate 172. When the shutoff actuator 152 is moved to the partially open position, the body 154, rotating keys 182, and first gate 162 rotate such that the windows 166 of the first gate 162 are partially aligned with the windows 176 and shutter portions 178 of the second gate 172. For example, the partially open position of the shutoff mechanism 150 may be in between the open and closed positions of the shutoff mechanism 150. When the shutoff mechanism 150 is in the partially open position, the passage through the first and second gates 162, 172 is less than the area of the windows 166, 176 of the first and second gates 162, 172. In such embodiment, the partial alignment of the windows 166, 176 of the first and second gates 162, 172 partially allows fluid upstream of the first gate 162 from flowing downstream of the second gate 172.

While the shutoff mechanism 150 has been described as being rotationally coupled with the shutoff actuator 152, it will be understood that the shutoff mechanism 150 may be operated in other manners. For example, the shutoff actuator 152 may include a slider, touch screen, toggle button, or the like which is electrically or mechanically coupled with the body 154 of the shutoff mechanism 150 to rotate the body 154 of the shutoff mechanism 150.

In an exemplary embodiment, the shutoff mechanism 150 may also include a filter seal 186 disposed in the shutoff flow path 156 upstream of the first gate 162. The filter seal 186 may be configured to prevent water from flowing around the first and second gates 162, 172. The filter seal 186 may extend from an upstream end of the shutoff mechanism 150 and abut the upstream side of the first gate 162. The filter seal 186 may be a ring with an inner diameter larger than the maximum diameter of the windows 166, 176 of the first and second gates 162, 172 and smaller than the outer circumferences 164, 174 of the gates 162, 172. The filter seal 186 may have an outer diameter substantially equal to the diameter of the coupling portion 170 of the first gate 162 such that the rotating keys 182 of the shutoff mechanism 150 may be disposed in the coupling portions 170 of the first gate 162 with the filter seal 186 disposed therebetween. In some embodiments, the filter seal 186 is uncoupled from the body 154 and the first gate 162.

The shutoff mechanism 150 may also include an upstream seal 196 disposed at an upstream end of the shutoff mechanism 150. For example, the upstream seal 196 may be disposed around and/or upstream of the first gate 162. The upstream seal 196 may be configured to prevent or otherwise restrict the flow of fluid upstream of the shutoff mechanism 150. In some embodiments, the upstream seal 196 is an O-ring type seal.

The shutoff mechanism 150 may also include a downstream seal 198 disposed at a downstream end of the shutoff mechanism 150. For example, the downstream seal 198 may be disposed around and/or downstream of the second gate 172. The downstream seal 198 may be configured to prevent or otherwise restrict the flow of fluid downstream of the shutoff mechanism 150. In some embodiments, the downstream seal 198 is an O-ring type seal.

While the shutoff mechanism 150 is described as having two gates 162, 172, the shutoff mechanism 150 may include any number of gates. For example, the shutoff mechanism 150 may include a single gate with a controllable aperture configured to open and close and control the flow of water through the wand 20. Alternatively, the shutoff mechanism 150 may include three or more gates which may be controlled to adjust the flow of water through the wand 20.

Referring back to FIG. 4, the wand hose 30 may be coupled with the connector 200 and the wand 20 such that the wand hose 30 may provide two separate fluids to the wand 20. The wand hose 30 may be a single hose which supplies treated water, such as continuously pressurized treated water, to one waterway of the wand 20 and mixed water to another waterway of the wand 20 and such that the wand 20 may be pulled away from a body of the faucet 10 and manipulated by a user.

An input (e.g., the second bore 226) of the connector 200 may be coupled with the downstream end of the mixed water hose 22 and an output (e.g., the third bore 244) of the connector 200 may be coupled with the upstream end of the outer hose 32 of the wand hose 30. The inner hose 42 of the wand hose 30 may extend through the connector 200 and couple with a treated water supply, such as the filter system 300 (FIG. 4). The inner hose 42 may receive treated water, such as a continuously pressurized supply of treated water, such that the treated water flows through the first flow path 52 of the wand hose 30. In an exemplary embodiment, the filter outlet 306 is coupled with the upstream end of the inner hose 42 which extends through the first inlet portion 204 of the connector 200 such that the inner hose 42 receives a supply of treated water, such as a continuously pressurized supply of treated water. In other embodiments, the filter outlet 306 of the filter 302 is connected to the first inlet portion 204 of the connector 200 via a first supply hose to supply treated water toward the connector 200. In some embodiments, the filter 302 supplies continuously pressurized filtered water to the connector 200.

The connector 200 may receive mixed water from the mixed water hose 22 and direct the mixed water to the wand hose 30 such that the mixed water flows through the second flow path 54 of the wand hose 30. The first flow path 52 may extend through and within the second flow path 54. The downstream end of the mixed water hose 22 may be connected to the second inlet portion 222 of the connector 200, such as directly or indirectly via a second supply hose, to supply mixed water to the connector 200. The upstream end of the outer hose 32 may be coupled with the outlet portion 240 of the connector 200, the wand hose 30 may extend through the body of the faucet 10, and the downstream end of the wand hose 30 may be coupled with an upstream portion of the wand 20. The wand hose 30 may separately supply the fluid supplies directed through the connector 200 to the wand 20.

In an exemplary embodiment, the connector 200 is not mounted or constrained to a mounting surface. During use, the connector 200 may move or otherwise adjust position or orientation, such as when mixed water and/or treated water, such as continuously pressurized treated water, is supplied to the faucet 10. In other embodiments, the connector 200 may be mounted to a mounting surface, such as below a counter or sink.

The contents of the mixed water hose 22, such as mixed water, flows from the mixed water hose 22 to the second inlet portion 222 of the connector 200. The fluid flows into the second bore 226, through the check valve 268, through the second passage 266, and into the third bore 244. The fluid may flow around the outer surface 50 of the inner hose 42 and into the second flow path 54 of the wand hose 30 between the outer surface 50 of the inner hose 42 and the inner surface 38 of the outer hose 32. The fluid may flow through the second flow path 54 of the wand hose 30 to a second waterway of the wand 20 coupled to a downstream end of the wand hose 30.

The wand hose 30 may extend downstream end of the connector 200, through the body of the faucet 10, and provide two separate flow paths to be output from the wand 20 of the faucet 10. The downstream end of the wand hose 30 may be coupled with an upstream end of the wand 20. The first flow path 52 of the wand hose 30 may be fluidly coupled with the first waterway 130 extending through the wand 20, such as to provide treated water to the first waterway 130. The second flow path 54 of the wand hose 30 may be fluidly coupled with the second waterway 134 extending through the wand 20, such as to provide mixed water to the second waterway. The first flow path 52 may provide a continuously pressurized flow of treated water, such as filtered water, to the first waterway 130 of the wand 20.

The wand 20 may be pulled away from the receptor 18 of the faucet 10, manipulated by a user, or pulled away from the receptor 18 and manipulated by a user. For example, the wand 20 may be operated by the user to provide treated water and/or mixed water out of one or more outlets of the wand 20. The wand hose 30 may be sized, shaped, and configured such that the inner hose 42 may be continuously pressurized and the wand hose 30 may be pulled away from the body of the faucet 10 and manipulated by a user. The downstream end of the inner hose 42 may be relatively unsecured in the wand 20 such that the inner hose 42 may flex, bend, translate, etc. within the outer hose 32 when the inner hose 42 is pressurized. The wand hose 30 may also be sized, shaped, and configured such that the outer hose 32 may move independently of the inner hose 42 and such that a second flow of fluid may flow through the outer hose 32 when the inner hose 42 is pressurized. In an exemplary embodiment, the inner hose 42 is continuously pressurized with a continuous supply of filtered water.

The wand hose 30 may provide treated water, such as continuously pressurized filtered water, via the first flow path 52 to the first waterway 130 of the wand 20 to provide treated water from the first or treated water outlet of the wand 20. In some embodiments, treated water may be provided instantaneously or near instantaneously from the treated water outlet when desired, such as when the wand 20 is operated by a user. As shown in FIGS. 15-26, the wand 20 may include a shutoff mechanism 150 disposed in the first waterway 130 to control the flow of the fluid from the first flow path 52 of the wand hose 30 out of the first outlet 132 of the wand 20. The shutoff mechanism 150 may be controlled by a shutoff actuator on the wand 20 configured to move the shutoff mechanism between a closed position which prevents fluid in the first waterway 130 from flowing downstream past the shutoff mechanism 150 and an open position which permits the fluid in the first waterway 130 to flow to the filtered water outlet and out of the wand 20.

The shutoff actuator 152 may be configured to control the position or operation of the shutoff mechanism 150. In some embodiments, the shutoff actuator 152 is disposed in the top or side of the wand 20 such that a user may control the flow of fluid through the first waterway 130 while the wand 20 is pulled away from the receptor 18. In an exemplary embodiment, the shutoff mechanism 150 includes first and second gates 162, 172 with a plurality of windows 166, 176 which control the flow through the first waterway to a first outlet 132 at a downstream end of the first waterway 130. The shutoff mechanism 150 may be configured to control the flow of a supply of continuously pressurized fluid, such as treated water, through the first waterway 130 of the wand 20.

The shutoff actuator 152 may move the shutoff mechanism between a first or closed position configured to prevent fluid flow through the first waterway 130 and a second or open position configured to allow fluid flow through the first waterway 130. The shutoff actuator 152 may be configured to move or rotate a body 154 of the shutoff mechanism 150 which controls the rotation of the first gate 162 relative to the second gate 172. The relative rotation of the first and second gates 162, 172 may control the size or configuration of a flow path through the shutoff mechanism 150.

In an exemplary embodiment, the shutoff actuator 152 rotates the shutoff mechanism 150 between the first position and the second position to control the alignment of the windows 166, 176 of the first and second gates 162, 172 and thereby control the size of the flow path through the shutoff flow path 156 of the shutoff mechanism 150. For example, in the closed position, the windows 166, 176 of the first and second gates 162, 172 may be offset such that there is no flow path through the shutoff mechanism 150 and, in the open position, the windows 166, 176 of the first and second gates 162, 172 may be aligned such that the windows 166, 176 define a flow path through the shutoff mechanism 150. In some embodiments, the shutoff actuator 152 may also include a third or partially open position which permits some flow of fluid through the shutoff flow path 156 of the shutoff mechanism 150. For example, in the partially open position, the windows 166, 176 of the first and second gates 162, 172 may be partially aligned such that the windows 166, 176 define a flow path with reduced area through the shutoff mechanism 150.

The wand hose 30 may also provide mixed water via the second flow path 54 to the second waterway 134 of the wand 20 to provide mixed water out of the aerator and/or spray outlets 136, 138. As shown in FIGS. 16-17, the wand 20 may include a diverter mechanism 190 disposed in the second waterway 134. The diverter mechanism 190 may be configured to divert or otherwise control the flow of the second fluid to one or more outlets 136, 138 at a downstream end of the second waterway 134. The diverter mechanism 190 may be operable by a diverter actuator 192 to control the second fluid flow to one or more outlets of the second waterway 134. For example, the diverter mechanism 190 may be adjusted, such as by the diverter actuator 192, to move the diverter mechanism 190 between a first position which directs the fluid of the second waterway 134 to the aerator outlet, a second position which directs the fluid to the aerator outlet and one or more spray outlets, and a third position which directs the fluid to the one or more spray outlets. In some embodiments, the wand 20 may provide fluids from the first and second flow paths 52, 54 of the wand hose 30 out of the first and second waterways 130, 134, simultaneously. The wand 20 may be retracted upstream to the receptor 18 after use.

While the wand hose 30 has been described as providing two separate flows of fluid to the wand 20, it will be understood that the wand hose 30 and the wand 20 may have different configurations and uses. For example, the wand hose 30 may include more than one inner hose disposed through the outer hose 32 to provide additional flows of fluid to the wand 20.

Additionally, while the faucet system 500 has been described as providing continuously pressurized filtered water through the first flow path 52 of the wand hose 30 and mixed water through the second flow path 54 of the wand hose 30, it will be understood that the faucet system 500 may have other suitable configurations. For example, the inner hose 42 of the wand hose 30 may be coupled with other treated water supplies to provide other treated water, such as a continuously pressurized supply of treated water, to the first flow path 52 of the wand hose 30, such as heated, sterilized (e.g., via ultraviolet sterilization), fluoridated, pH corrected, or softened/hardened water.

One of ordinary skill in the art will now appreciate that the present invention provides a faucet system with a wand which may be pulled away from a body of a faucet and manipulated by a user and which may receive two separate flow paths via a single wand hose and a connector, one the flow paths may be continuously pressurized, and a shutoff mechanism in the wand configured to control the flow of a continuously pressurized fluid. Although the present invention has been shown and described with reference to particular embodiments, equivalent alterations and modifications will occur to those skill in the art upon reading and understanding this specification. The present invention includes all such equivalent alterations and modifications and is limited only by the scope of the following claims in light of their full scope of equivalents.

What is claimed is:

1. A wand hose for a wand that can be pulled away from a body of a faucet, the wand hose comprising:

an outer hose having an inlet, an outlet, and an inner surface; and an inner hose extending through the outer hose and having an inlet, an outlet, an inner surface, and an outer surface;

wherein downstream ends of the outer hose and inner hose are configured to operatively couple with an upstream portion of the wand;

wherein the inner hose is operable to receive a first fluid supply;

wherein the wand hose is operable to receive a second fluid supply;

wherein the wand hose is configured to extend through a spout of the faucet;

wherein the inner hose is continuously pressurized up to the wand; and wherein the inner hose is longitudinally translatable relative to the outer hose.

2. The wand hose of claim 1, further comprising a hose coupler disposed at a downstream end of the outer hose and configured to operatively couple the outer hose with the wand.

3. The wand hose of claim 1, wherein the inner hose extends downstream through the hose coupler.

4. A wand hose for a wand that can be pulled away from a body of a faucet, the wand hose comprising:

an outer hose having an inlet, an outlet, and an inner surface; and an inner hose extending through the outer hose and having an inlet, an outlet, an inner surface, and an outer surface;

wherein downstream ends of the outer hose and inner hose are configured to operatively couple with an upstream portion of the wand;

wherein the inner hose is operable to receive a first fluid supply;

wherein the wand hose is operable to receive a second fluid supply;

wherein the wand hose is configured to extend through a spout of the faucet;

wherein the inner hose is continuously pressurized up to the wand; and wherein the inner hose is rotatable relative to the outer hose.

5. The wand hose of claim 4, further comprising a hose coupler disposed at a downstream end of the outer hose and configured to operatively couple the outer hose with the wand.

6. The wand hose of claim 5, wherein the inner hose extends downstream through the hose coupler.

7. A wand hose for a wand that can be pulled away from a body of a faucet, the wand hose comprising:

an outer hose having an inlet, an outlet, and an inner surface; and an inner hose extending through the outer hose and having an inlet, an outlet, an inner surface, and an outer surface;

wherein downstream ends of the outer hose and inner hose are configured to operatively couple with an upstream portion of the wand;

wherein the inner hose is operable to receive a first fluid supply;

wherein the wand hose is operable to receive a second fluid supply;

wherein the wand hose is configured to extend through a spout of the faucet;

wherein the inner hose is continuously pressurized up to the wand; and further comprising a fitting disposed at the downstream end of the inner hose and configured to slidably retain the downstream end of the inner hose within the wand.

8. The wand hose of claim 7, further comprising a hose coupler disposed at a downstream end of the outer hose and configured to operatively couple the outer hose with the wand.

9. The wand hose of claim 8, wherein the inner hose extends downstream through the hose coupler.

10. A faucet comprising:

a body, the body including a spout;

a wand having a first waterway and a second waterway; and a wand hose having an outer hose and an inner hose extending through the outer hose, the wand hose configured to extend through the spout;

wherein a downstream end of the wand hose is coupled with an upstream portion of the wand with a downstream end of the inner hose rotatably disposed in the first waterway;

wherein the wand hose is configured to direct a continuously pressurized supply of a first fluid through the inner hose to the first waterway of the wand; and wherein the wand hose is configured to direct a supply of a second fluid to the second waterway of the wand.

11. The faucet of claim 10, wherein the downstream end of the inner hose is longitudinally movable within the first waterway.

12. The faucet of claim 10, further comprising a fitting disposed at the downstream end of the inner hose configured to slidably retain the downstream end of the inner hose within a portion of the first waterway.

13. The faucet of claim 10, wherein the outer hose is rotatable relative to the inner hose.

14. The faucet of claim 10, further comprising a hose coupler disposed at a downstream end of the outer hose and configured to operatively couple the outer hose with the wand.

15. The faucet of claim 14, wherein the inner hose extends downstream through the hose coupler.

16. The faucet of claim 14, wherein the wand is configured to swivel about the hose coupler.

17. The faucet of claim 10, wherein the inner hose is slidably and rotatably retained in a hose receiving portion of the wand.

18. The faucet of claim 10, wherein the wand hose is configured to provide treated water to the first waterway and mixed water to the second waterway.

19. A wand hose for a wand of a faucet, the wand hose comprising:

an outer hose having an inlet, an outlet, and an inner surface; and an inner hose extending through the outer hose and having an inlet, an outlet, an inner surface, and an outer surface;

wherein downstream ends of the outer hose and inner hose are coupled with the wand;

wherein the inner hose is operable to receive a treated water supply through the inner hose;

wherein the wand hose is operable to receive a mixed water supply;

wherein the wand hose is configured to extend through a spout of the faucet;

wherein the inner hose is continuously pressurized up to the wand; and wherein the inner hose is flexible relative to the outer hose.

20. The faucet system of claim 19, further comprising a hose coupler disposed at a downstream end of the outer hose and configured to operatively couple the outer hose with the wand.

* * * * *